US010421465B1

(12) United States Patent
Jutkowitz et al.

(10) Patent No.: US 10,421,465 B1
(45) Date of Patent: Sep. 24, 2019

(54) ADVANCED DRIVER ATTENTION ESCALATION USING CHASSIS FEEDBACK

(71) Applicant: SF Motors, Inc., Santa Clara, CA (US)

(72) Inventors: Avery Jutkowitz, Santa Clara, CA (US); Jaime Camhi, Santa Clara, CA (US)

(73) Assignees: CHONGQING JINKANG NEW ENERGY VEHICLE CO., LTD., Chongqiang (CN); SF MOTORS, INC., Santa Clara, CA (US)

(*) Notice: Subject to any disclaimer, the term of this patent is extended or adjusted under 35 U.S.C. 154(b) by 0 days.

(21) Appl. No.: 16/033,977

(22) Filed: Jul. 12, 2018

(51) Int. Cl.
| | |
|---|---|
| *B60Q 1/00* | (2006.01) |
| *B60W 50/16* | (2012.01) |
| *G05D 1/00* | (2006.01) |
| *B60W 10/22* | (2006.01) |
| *B60W 10/18* | (2012.01) |
| *B60W 10/20* | (2006.01) |
| *B60W 40/08* | (2012.01) |
| *B60W 10/04* | (2006.01) |

(52) U.S. Cl.
CPC ............ *B60W 50/16* (2013.01); *B60W 10/04* (2013.01); *B60W 10/18* (2013.01); *B60W 10/20* (2013.01); *B60W 10/22* (2013.01); *B60W 40/08* (2013.01); *G05D 1/0061* (2013.01); *G05D 1/0088* (2013.01); *B60W 2040/0818* (2013.01); *B60W 2550/14* (2013.01); *G05D 2201/0213* (2013.01)

(58) Field of Classification Search
CPC ...... B60W 50/16; B60W 10/04; B60W 10/18; B60W 10/20; B60W 10/22; B60W 40/08; G05D 1/0061; G05D 1/0088; B60Q 1/00
See application file for complete search history.

(56) References Cited

U.S. PATENT DOCUMENTS

| | | | |
|---|---|---|---|
| 2016/0209841 A1* | 7/2016 | Yamaoka | G05D 1/0061 |
| 2016/0304124 A1* | 10/2016 | Fujiyoshi | B62D 1/286 |
| 2017/0050638 A1* | 2/2017 | Gordon | B60W 30/16 |
| 2018/0061242 A1* | 3/2018 | Bavar | B60W 50/082 |
| 2019/0101915 A1* | 4/2019 | Yoon | B60W 40/09 |

* cited by examiner

*Primary Examiner* — Phung Nguyen
(74) *Attorney, Agent, or Firm* — Foley & Lardner LLP; James De Vellis

(57) ABSTRACT

Provided herein are systems and methods of alerting occupants in electric or other vehicles to assume manual control of vehicular functions. An environment sensing module can identify a condition to have an occupant within the vehicle assume manual control of a vehicular function. A chassis control module can control actuation of a suspension system, an acceleration system, a brake system, and a steering system. The chassis control module can have a normal mode and an escalation mode. The normal mode can reduce an external force feedback from outside the vehicle. The escalation mode can mechanically induce an internal force feedback from within the vehicle. A policy enforcement module can cause the chassis control module to change from the normal mode to the escalation mode to use one of a plurality of defined feedback patterns as the mechanically induced internal force feedback to convey the identified condition to the occupant.

20 Claims, 4 Drawing Sheets

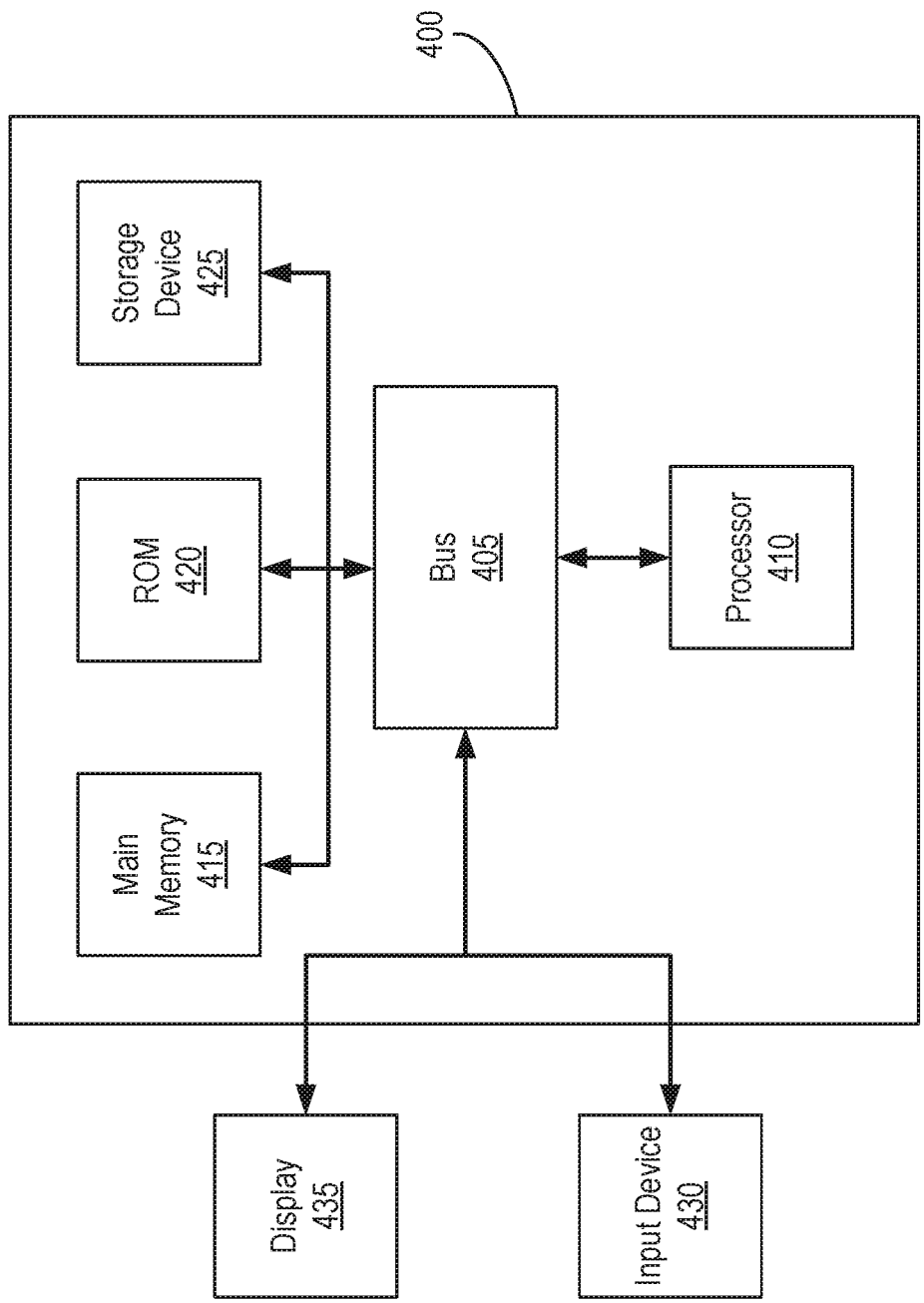

ADVANCED DRIVER ATTENTION ESCALATION USING CHASSIS FEEDBACK

BACKGROUND

Vehicles such as automobiles can gather information related to vehicle operation or to environments about the vehicle. This information can indicate a status of the vehicle or environmental conditions for autonomous driving.

SUMMARY

The present disclosure is directed to systems and methods of alerting occupants in vehicles such as electric, fossil fuel, or hybrid vehicles to assume manual control of vehicular functions. A semi-autonomous vehicle can switch between an autonomous mode and a manual mode, and can indicate to an occupant (e.g., a driver or a passenger) to assume manual control of vehicular function when switching from the autonomous mode to the manual mode. The disclosed advanced driver-assistance system (ADAS) can alert the occupant to assume manual control by mechanically inducing one of a set of predefined force feedback patterns via a chassis control system. By mechanically inducing a force feedback pattern, the disclosed ADAS can allow for improvement in vehicle functionality and increase the operability of the vehicle across various environments.

At least one aspect is directed to a system to alert occupants in electric or other types of vehicles to assume manual control of vehicular functions. The system can include an environment sensing module that executes on a data processing system. The data processing system can have one or more processors. The data processing system can be disposed in an electric vehicle. The environment sensing module can identify a condition to have an occupant within the electric vehicle assume manual control of a vehicular function from autonomous operation. The system can include a chassis control module that executes on the data processing system. The chassis control module can control actuation of at least one of a suspension system, an acceleration system, a brake system, and a steering system of the electric vehicle. The chassis control module can have a normal mode and an escalation mode. The normal mode can control the actuation to react to an external force feedback from outside the electric vehicle propagating through the electric vehicle to the occupant. The escalation mode can control the actuation to mechanically induce an internal force feedback from within the electric vehicle to alert the occupant to assume manual control of the vehicular function. The system can include a policy enforcement module that executes on the data processing system. The policy enforcement module can cause, responsive to the identified condition, the chassis control module to change from the normal mode to the escalation mode, and to use one of a plurality of defined feedback patterns as the mechanically induced internal force feedback to convey the identified condition to the occupant.

At least one aspect is directed to an electric or other type of vehicle. The electric vehicle can include an environment sensing module that executes on a data processing system. The data processing system can have one or more processors. The environment sensing module can identify a condition to have an occupant within the electric vehicle assume manual control of a vehicular function from autonomous operation. The electric vehicle can include a chassis control module that executes on the data processing system. The chassis control module can control actuation of at least one of a suspension system, an acceleration system, a brake system, and a steering system of the electric vehicle. The chassis control module can have a normal mode and an escalation mode. The normal mode can control the actuation to react to an external force feedback from outside the electric vehicle propagating through the electric vehicle to the occupant. The escalation mode can control the actuation to mechanically induce an internal force feedback from within the electric vehicle to alert the occupant to assume manual control of the vehicular function. The electric vehicle can include a policy enforcement module that executes on the data processing system. The policy enforcement module can cause, responsive to the identified condition, the chassis control module to change from the normal mode to the escalation mode, and to use one of a plurality of defined feedback patterns as the mechanically induced internal force feedback to convey the identified condition to the occupant.

At least one aspect is directed to a method of alerting occupants in electric or other types of vehicles to assume manual control of vehicular functions. A data processing system having one or more processors disposed in an electric vehicle can identify a condition to have an occupant within the electric vehicle assume manual control of a vehicular function from autonomous operation. The data processing system can cause, responsive to the identified condition, a chassis control module of the electric vehicle to change from a normal mode to an escalation mode. The chassis control module can be configured to control actuation of at least one of a suspension system, an acceleration system, a brake system, and a steering system of the electric vehicle. The normal mode can control the actuation to reduce or allow an external force feedback from outside the electric vehicle propagating through the electric vehicle to the occupant. The escalation mode can control the actuation to mechanically induce an internal force feedback from within the electric vehicle to alert the occupant to assume manual control of the vehicular function. The data processing system can use one of a plurality of defined feedback patterns as the mechanically induced internal force feedback to convey the identified condition to the occupant.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 4 is a block diagram illustrating an architecture for a computer system that can be employed to implement elements of the systems and methods described and illustrated herein.

DETAILED DESCRIPTION

Figure 1:
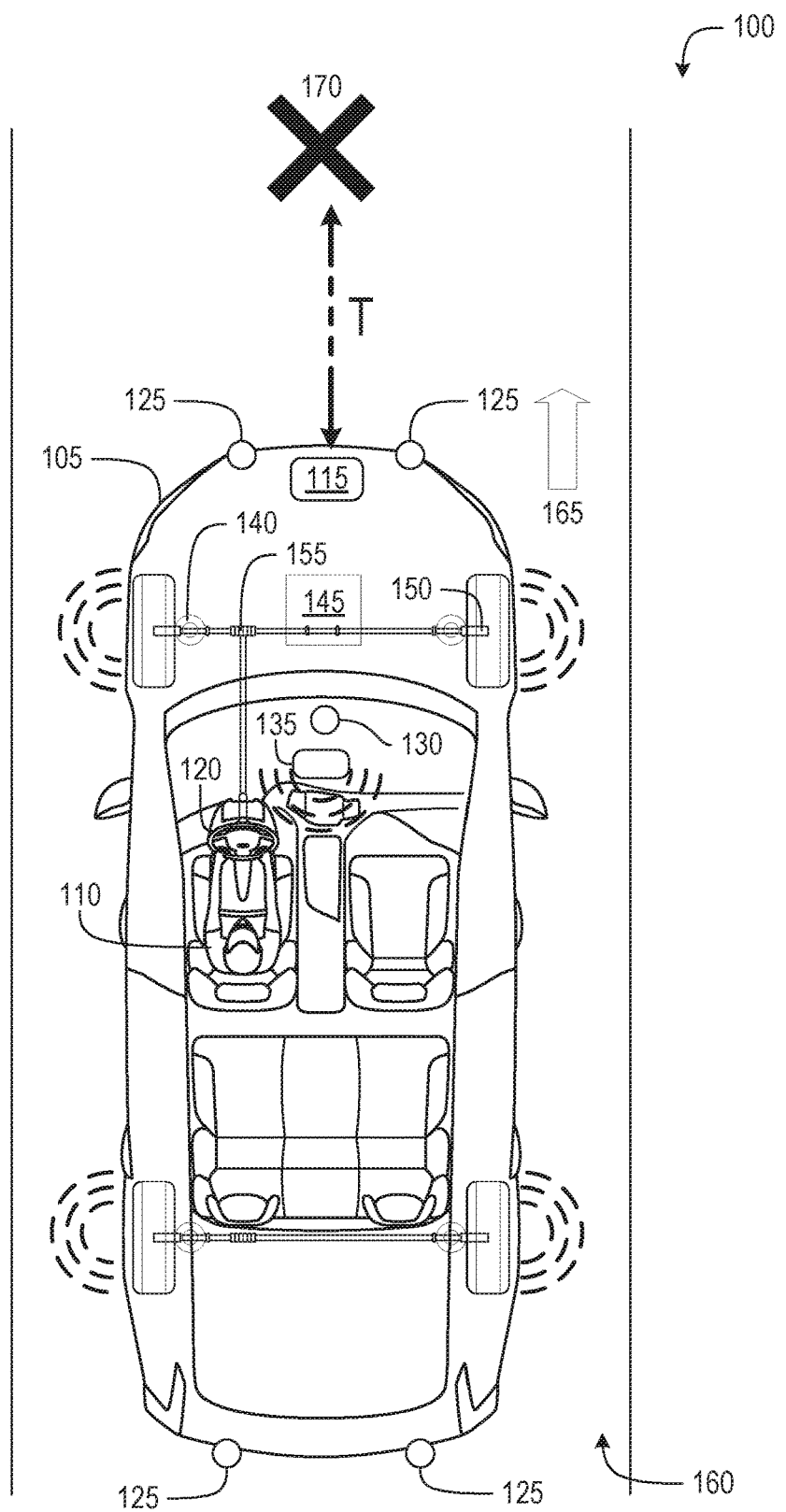
FIG. 1 is a block diagram depicting an example environment to alert occupants in vehicles to assume manual control of vehicular functions.

Following below are more detailed descriptions of various concepts related to, and implementations of, methods, apparatuses, and systems of alerting occupants in vehicles such as electric, hybrid, or fossil fuel vehicles to assume manual control of vehicular functions. The various concepts introduced above and discussed in greater detail below may be implemented in any of numerous ways.

Described herein are systems and methods of alerting occupants in electric or other types of vehicles to assume manual control of vehicular functions. Vehicular functions can refer to functions for navigating or maneuvering a vehicle, such as steering, acceleration, and braking, among other functions. Vehicles can include electric vehicles, hybrid vehicles, gas, natural gas, or other fossil fuel vehicles, hydrogen vehicles, automobiles, motorcycles, passenger vehicles, trucks, planes, helicopters, submarines, or vessels, among others. A semi-autonomous vehicle can have an autonomous mode and a manual mode. In the autonomous mode, the vehicle can use sensory data of an environment about the vehicle from various external sensors to autonomously maneuver through the environment. In the manual mode, the vehicle can have an occupant (e.g., a driver) to manually operate vehicle control systems to guide the vehicle through the environment. Whether the vehicle is in the autonomous mode or the manual mode may for example depend on at least one of: environment conditions surrounding the vehicle, user actions in the vehicle, and a data processing system of the vehicle.

To ensure that the occupant can diligently or attentively supervise, manage or control the operations and maneuvering of the vehicle, an advanced driver-assistance system (that can be referred to herein as ADAS or as a data processing system) of the electric (or other type of) vehicle can present an indication to the driver to take manual control of vehicular functions such as acceleration, steering, and braking. The indication can be presented in advance of changing the vehicle control systems from the autonomous mode to the manual mode. With increasing levels of autonomy in vehicles, the proper functioning of such vehicles may ever more depend on the presentation of the indication to the occupant. The indications can include an audio output, a visual output, or a tactile output generated within a passenger compartment within the vehicle. For example, the vehicle can flicker lights on a dashboard, render on-screen notifications, output audible warnings, or cause vibrations in a steering wheel or seat in an attempt to grab the driver's attention.

Such stimuli generated within the passenger compartment, however, may not be always successful at grabbing ahold of the driver's attention. With a distracted driver, for instance, visual indications may be ignored especially when the driver's visual focus is in another direction. Audio indications may be misinterpreted or may be misconstrued as part of another source of audio stimuli (e.g., multimedia or phone conversation). Furthermore, tactile indications may also be misunderstood as part of another source, may not be perceived at all with an inattentive driver, and may not relay information regarding a course of action to take on the part of the driver. The low effectiveness in guaranteeing a driver's attention can lead to degradation in the quality of the human-computer interaction (HCI) between the occupant and the vehicle, such as loss of trust in the autonomous driving capabilities. Furthermore, a higher probability that the driver will not assume manual control of vehicular functions in such schemas can result in decreased general utility of the vehicle, especially the vehicle's autonomous mode functionality.

To address the technical challenges apparent in such situations, the ADAS of the electric or other type of vehicle can actuate chassis controls to mechanically induce force feedback to get the driver's attention, when the other stimuli may fail at doing so. The chassis controls already equipped in the vehicle can include a suspension system, an acceleration system, a brake system, and a steering system. Such controls can be typically used to stabilize or dampen any turbulence or disturbance instigated from outside the vehicle, such as a protrusion (e.g., a bump) or an indent (e.g., sinkhole) in the road. Contrary to the typical use, these same chassis controls can also be used to induce the force feedback internally through the vehicle. For example, to jolt the driver into an attentive state, the ADAS can cause the brake to send a series of quick decelerations to shake the vehicle back and forth for instance. The ADAS can also cause the steering to move and shake or move the vehicle side-to-side or in other direction(s). The ADAS can actuate the suspension system to vertically shake the driver by adjusting at least one of the bounce, damping, pitch and roll of the vehicle. The probability that the driver perceives actuation of chassis controls can be higher than the probability of perception of audio, visual, or tactile stimuli as discussed above.

The mechanical inducement of the force feedback can be done in accordance to a defined feedback pattern. By actuating the chassis controls, the ADAS can simulate driving surface conditions, such as a rumble strip, Bott's dots, a speed bump, as well as any other road disturbances. The ADAS can configure actuation of the chassis controls to select one of the defined feedback patterns to alert the driver to different conditions. For example, if a dead-end is detected ahead on the road, the ADAS can cause the chassis controls to pump the brakes to alert the driver of the end-end and to assume manual control by stepping on the brakes. In another example, if a junction is identified on the road, the ADAS can cause the chassis controls to control the steering to sway the vehicle side to side to alert the driver to hold the steering wheel. Each of the defined feedback patterns can be designed to alert the driver to a specific, recognizable condition distinguishable from the other conditions. Once the driver assumes manual control of vehicular functions, the ADAS can halt actuation of the chassis controls and can switch from the autonomous mode to the manual mode.

Because mechanically induced perturbations (of a recognizable feedback pattern distinguishable from other patterns) via the chassis controls have a higher probability to be perceived by the driver than visual, audio, or tactile stimuli, the ADAS can improve the quality of the HCI between the individual driver and other occupants with the vehicle. Furthermore, the operability and overall utility of the vehicle can be increased over a wider array of environments. Now, the driver of the vehicle can perform other tasks within the vehicle while the vehicle is in the autonomous mode, and can turn attention to operating the vehicular controls when summoned to assume manual control. Additionally, by reducing the use of visual, audio, and tactile stimuli while increasing the probability of perception with mechanical inducement via chassis controls, the expenditure of computing resources and electric power spent on generating such stimuli can be reduced, thereby increasing the efficiency of the ADAS. Thus the systems and methods described herein improve the efficiency of operation and control of vehicles relative to vehicles lacking the advanced driver assistance system described herein by, among other things, optimizing the timing, notification, and type of driver alerts. The structure and operation of the ADAS improves the transition of vehicle operating states between autonomous, semi-autonomous, and manual modes of operation relative the vehicles that do not have the ADAS described herein.

FIG. 1 depicts a block diagram of an example environment 100 to alert occupants in electric or other types of vehicles to assume manual control of vehicular functions. The environment 100 can include at least one vehicle 105 such as at least one electric vehicle 105 on a driving surface 160 (e.g., a road). The vehicle 105 (which can also be referred to herein by reference to the example of an electric vehicle 105) may include, for example, an automobile (e.g., a passenger sedan, a truck, a bus, electric vehicle, fossil fuel vehicle, hybrid-electric vehicle, or a van), a motorcycle, an airplane or helicopter, a locomotive, or a watercraft, among other vehicles. The vehicle 105 can be equipped with or can include at least one advanced driver-assistance system (ADAS) 115 (e.g., a data processing system 115 that can include at least one processor, memory storage unit or control circuitry), one or more driving controls 120, one or more environmental sensors 125, one or more compartment sensors 130, and one or more user interfaces 135, among other components. The ADAS 115 can include one or more processors and memory disposed throughout the vehicle 105 or remotely operated from the vehicle 105, or in any combination thereof. The vehicle 105 can also be equipped with or can include chassis controls, such as at least one suspension system 140, at least one acceleration system 145, at least one brake system 150, and at least one steering system 155. The vehicle 105 can also have one or more occupants 110 seated or located in a passenger compartment. The environmental sensors 125 and the compartment sensors 130 may be generally referred to as sensors. An occupant 110 generally located in the seat in front of the driving controls 120 as illustrated in FIG. 1 can be referred to herein as a driver. Other occupants 110 located in other parts of the passenger compartment can be referred to herein as passengers.

The ADAS 115 can, for example, be in an autonomous mode, maneuvering the driving surface 160 in the environment 100 in a direction of travel 165 using data acquired from the environmental sensors 125 about the electric or other type of vehicle 105. Sometime during the autonomous mode operation, the ADAS 115 can identify at least one condition 170 based on the data acquired from the environmental sensors 125. The ADAS 125 can apply a pattern recognition technique to identify the condition 170. Responsive to the identification of the condition 160, the ADAS 115 can change the operational mode of the electric vehicle 105 from the autonomous mode to the manual mode. The condition 170 can be in the direction of travel 165 relative to the electric vehicle 105 (e.g., forward as depicted). For example, the condition 170 can include a junction (e.g., an intersection, a roundabout, a turn lane, an interchange, or a ramp) or an obstacle (e.g., a curb, sinkhole, barrier, pedestrians, cyclists, or other vehicles) on the driving surface 160 in the direction of travel 165. The junction or the obstacle on the driving surface 160 can be identified by the ADAS 115 by applying image object recognition techniques on data acquired from cameras as examples of the environmental sensors 125. The condition 170 can be independent of the direction of travel 165 relative to the electric vehicle 105. For example, the condition 170 can include a presence of an emergency vehicle (e.g., an ambulance, a fire truck, or a police car) or another road condition (e.g., construction site) in the vicinity of the electric vehicle 105 (e.g., up to 10 km) independent of the direction of travel 165. The presence of the emergency vehicle or other road condition can be identified by the ADAS 115 by detecting a signal transmitted from the emergency vehicle or road condition. The ADAS 115 can also calculate a time T to the occurrence of the condition 170 based on current speed, acceleration (or deceleration), and the direction of travel 165.

With the identification of the condition 170, the ADAS 115 can present an indication via the user interface 135 to have the occupant 110 assume control of one or more vehicular functions. The user interface 135 can be used to present the indication, comprising audio stimuli, visual stimuli, or tactile stimuli, or any combination thereof, to call the occupant 110 to assume manual control of the driving controls 120. As the indication is presented, the ADAS 115 can maintain a timer to identify a time elapsed since the initiation of the presentation of the indication. The ADAS 115 can compare the elapsed time to a threshold time. The ADAS 115 may have set the threshold time based on the time T to the occurrence of the condition 170 (e.g., at a fixed fraction). The threshold time can correspond to a point in time at which the audio stimuli, visual stimuli, or tactile stimuli produced via the user interface 135 is deemed ineffective at bringing the occupant 110 to attention and to takeover manual control of the driving controls 120.

Responsive to determining that the elapsed time is greater than the threshold time, the ADAS 115 can change an operational mode of the chassis controls to mechanically induce a force feedback or perturbation from within the electric vehicle 105 in accordance to a defined feedback pattern. In some implementations, the ADAS 115 can change the operational mode of the chassis controls without presenting the indication comprising audio stimuli, visual stimuli, or tactile stimuli, or a combination thereof. The ADAS 115 can signal or communicate with the chassis controls 240 to mechanically induce a force feedback or perturbation that corresponds to a recognizable and defined feedback pattern distinguishable from other feedback patterns and vehicular perturbations. The defined feedback pattern can convey to the occupant 110 to take manual control as well as information about the condition 170 itself. The ADAS 115 can select the defined feedback pattern based on the condition 170 itself, among other factors. The chassis controls can initially be in a normal mode, and the ADAS 115 can change the operational mode of the chassis controls to an escalation mode. Under the normal mode, the chassis controls can react to an external force by reducing the external force from outside the electric vehicle 105, for example, by dampening shock from bumps in the driving surface 160 via the suspension system 140. Under the escalation mode, the chassis controls can mechanically induce a force feedback by actuating the suspension system 140, the acceleration system 145, the brake system 150, and the steering system 155 in accordance with the defined feedback pattern. The mechanically induced force feedback is independent of any concurrent or instantaneous bumps, perturbation or other force feedback transmitted from a road condition into the vehicle. When the occupant 110 assumes manual control of the driving controls 120, the ADAS 115 can return the operational mode of the chassis controls from escalation mode to normal mode. For example, the ADAS 115 can use tactile sensors on the steering wheel to detect that the occupant 120 has made contact with the steering wheel to assume manual control of the vehicle controls. In response, the ADAS 115 can switch the operational mode of the chassis controls from the escalation mode to the normal mode. The ADAS 115 can also switch from the autonomous mode to the manual mode, relying on driver input to maneuver the electric vehicle 105 through the environment 100.

Figure 2:
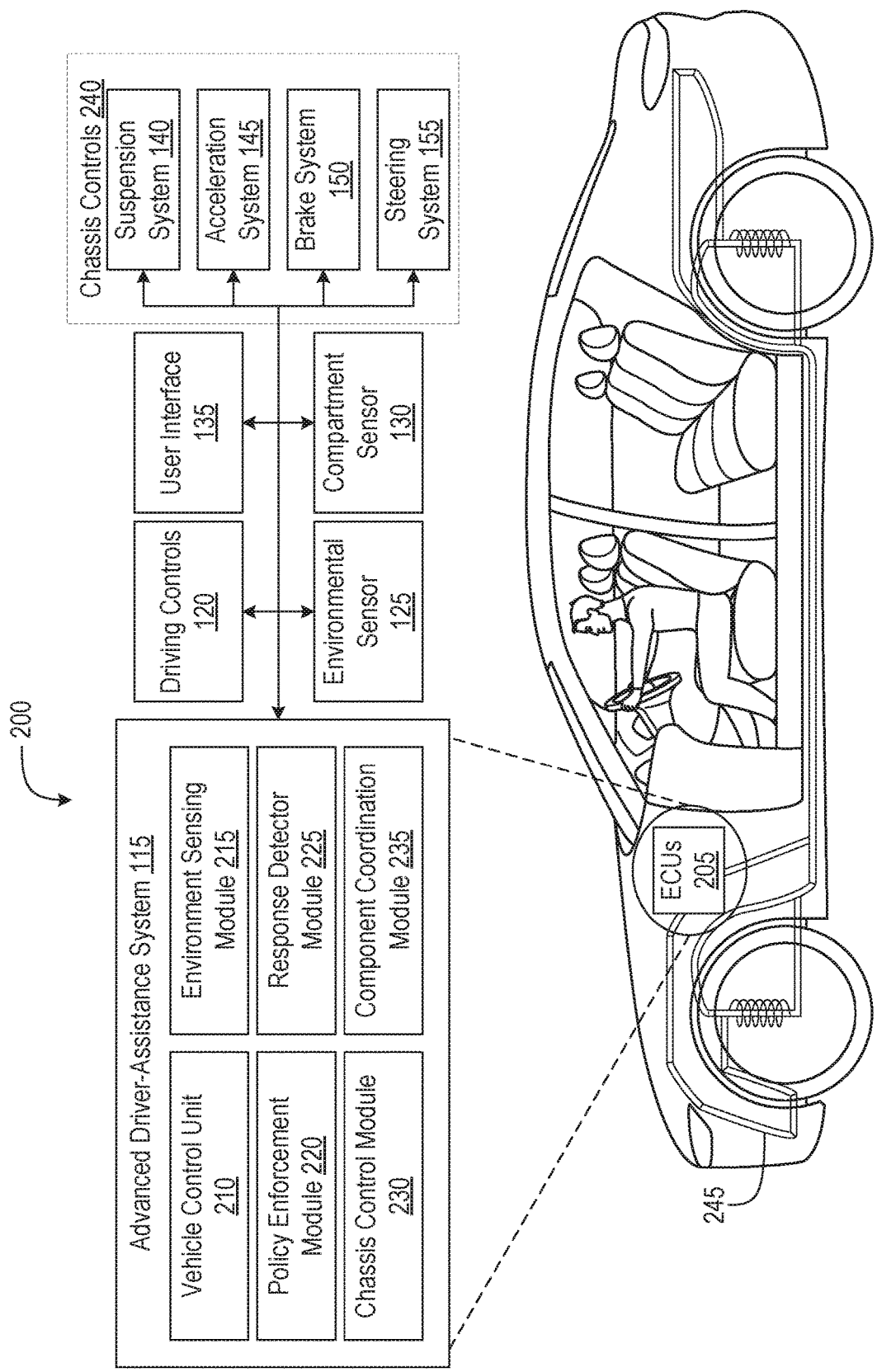
FIG. 2 is a block diagram depicting an example system to alert occupants in vehicles to assume manual control of vehicular functions.

FIG. 2 depicts a block diagram of an example system 200 to alert occupants in electric vehicles to assume manual control of vehicular functions. The system 200 can include one or more of the components of the environment 100 as shown in FIG. 1. The system 200 can include the electric vehicle 105 with at least one internal frame 245 and the advanced driver-assistance system (ADAS) 115. The electric vehicle 105 can be equipped or installed with or can otherwise include one or more driving controls 120, one or more environmental sensors 125, one or more compartment sensors 130, and one or more user interfaces 135, and one or more electronic control units (ECUs) 205. The electric vehicle 105 can also include the at least one suspension system 140, the at least one acceleration system 145, the at least one brake system 150, and the at least one steering system 155. The suspension system 140, the acceleration system 145, the brake system 150, and the steering system 155 can be collectively referred to or be part of the chassis controls 240. The ADAS 115 can include at least one vehicle control unit 210, at least one environment sensing module 215, at least one policy enforcement module 220, at least one response detector module 225, at least one chassis control module 230, and at least one component coordination module 235, among others.

Each of the components of the system 200 can include or be implemented using hardware or a combination of software and hardware. Each component in the ADAS 115, the chassis controls 240, and the ECUs 205 can include logical circuitry (e.g., a central processing unit) that responses to and processes instructions fetched from a memory unit. Each electronic component of the ADAS 115 and the ECUs 205 can receive, retrieve, access, or obtain input data from the driving controls 120, the environmental sensors 125, the compartment sensors 130, and the user interface 135, and to each other, among others. Each electronic component of the ADAS 115 and the ECUs 205 can generate, relay, transmit, or provide output data to the driving controls 130, the environmental sensors 125, the compartment sensors 130, and the user interface 135, and to each other, among others. Each electronic component of the ADAS 115 and the ECUs 205 can be provided by a microprocessor unit. Each electronic component of the ADAS 115, the chassis controls 240, and the ECUs 205 can be based on any of these processors, or any other processor capable of operating as described herein. The central processing unit can utilize instruction level parallelism, thread level parallelism, different levels of cache, and multi-core processors. A multi-core processor can include two or more processing units on a single computing component.

The one or more ECUs 205 can be networked together for communicating and interfacing with one another. Each ECU 205 can be an embedded system that controls one or more of the electrical system or subsystems in a transport vehicle. The ECUs 205, (e.g., automotive computers) can include a processor or microcontroller, memory, embedded software, inputs/outputs and communication link(s) to run the one or more components of the ADAS 115 among others. The ECUs 205 can be communicatively coupled with one another via wired connection (e.g., vehicle bus) or via a wireless connection (e.g., near-field communication). Each ECU 205 can receive, retrieve, access, or obtain input data from the driving controls 130, the environmental sensors 135, the compartment sensors 140, the user interface 145, and the remote server 110. Each ECU 205 can generate, relay, or transmit, or provide output data to the driving the driving controls 130, the environmental sensors 135, the compartment sensors 140, the user interface 145, and the remote server 110. Each ECU 205 can involve hardware and software to perform the functions configured for the module. The various components and modules the ADAS 115 can be implemented across the one or more ECUs 205. Various functionalities and subcomponents of the ADAS 115 can be performed in a single ECU 205. Various functionalities and subcomponents of the ADAS 115 can be split between the one or more ECUs 205 disposed in the electric vehicle 105 and the remote server 110. Various functionalities and sub-components of the ADAS 115 can be split between the one or more ECUs 205. For example, the vehicle control unit 210 can be implemented on multiple ECUs 205 in the electric vehicle 105.

The one or more environmental sensors 125 can be used by the various components of the ADAS 115 to acquire sensory data on the environment 100 about the electric vehicle 105. The sensory data can include any data acquired by the environmental sensor 125 measuring a physical aspect of the environment 100, such as electromagnetic waves (e.g., visual, infrared, violet, and radio waves). The one or more environmental sensors 125 can include a global position system (GPS) unit, a camera (e.g., for visual spectrum, infrared, or ultraviolet), a sonar sensor, a radar sensor, a light detection and ranging (LIDAR) sensor, and an ultrasonic sensor, among others. The one or more environmental sensors 125 can be also used by the various components of the ADAS 115 to sense or interface with other components or entities apart from the electric vehicle 105 via an vehicular ad-hoc network established with the other components or entities. The one or more environmental sensors 125 can include a vehicle-to-everything (V2X) unit, such as a vehicle-to-vehicle (V2V) sensor, a vehicle-to-infrastructure (V2I) sensor, a vehicle-to-device (V2D) sensor, or a vehicle-to-passenger (V2D) sensor, among others. The one or more environmental sensors 125 can be used by the various components of the ADAS 115 to acquire data on the electric vehicle 105 itself outside the passenger compartment. The one or more environmental sensors 125 can include a tire pressure gauge, a fuel gauge, a battery capacity measurer, a thermometer, an inertial measurement unit (IMU) (including a speedometer, an accelerator meter, a magnetometer, and a gyroscope), and a contact sensor, among others.

The one or more environmental sensors 125 can be installed or placed throughout the electric vehicle 105. Some of the one or more environmental sensors 125 can be installed or placed in a front portion (e.g., under a hood or a front bumper) of the electric vehicle 105. Some of the one or more environmental sensors 125 can be installed or placed in on a chassis or internal frame of the electric vehicle 105. Some of the one or more environmental sensors 125 can be installed or placed in a back portion (e.g., trunk or a back bumper) of the electric vehicle 105. Some of the one or more environmental sensors 125 can be installed or placed in on a suspension or steering system by the tires of the electric vehicle 105. Some of the one or more environmental sensors 125 can be placed on an exterior of electric vehicle 105. Some of the one or more environmental sensors 125 can be placed in the passenger compartment of the electric vehicle 105.

With cameras, as an example of the environmental sensors 125, multiple cameras can be placed throughout an exterior of the electric vehicle 105 and can face any direction (e.g., forward, backward, left, and right). The cameras can include camera systems configured for medium to high ranges, such as in the area between 80 m to 300 m. Medium range cameras can be used to warn the driver about cross-traffic, pedestrians, emergency braking in the car ahead, as well as lane and signal light detection. High range cameras are used for traffic sign recognition, video-based distance control, and road guidance. A difference between cameras for medium and high range can be the aperture angle of the lenses or field of view. For medium range systems, a horizontal field of view of 70° to 120° can be used, whereas cameras with a wide range of apertures can use horizontal angles of approximately 35°. The cameras can provide the data to the ADAS 115 for further processing.

With radar sensors, as an example of the environmental sensors 125, the radar sensors can be placed on a roof of the electric vehicle 105 for instance, or other location. The radar can transmit signal(s) within a frequency range. The radar can transmit signals with a center frequency. The radar can transmit signals that include an up-chirp or down-chirp. The radar can transmit bursts. For example, the radar can be based on 24 GHz or 77 GHz. The 77 GHZ radar can provide higher accuracy for distance and speed measurements as well as more precise angular resolution, relative to the 24 GHz radar. The 77 GHz can utilize a smaller antenna size and may have lower interference problems as compared to a radar configured for 24 GHz. The radar can be a short-range radar ("SRR"), mid-range radar ("MRR") or long-range radar ("LRR"). SRR radars can be configured for blind spot detection, blind spot monitoring, lane and lane-change assistance, rear end radar for collision warning or collision avoidance, park assist, or cross-traffic monitoring.

The SSR sensor can complement or replace ultrasonic sensors. SRR sensors can be placed at each corner of the electric vehicle 105, and a forward-looking sensor for long range detection can be positioned on the front of the electric vehicle 105. Extra sensors can be placed on each side mid-body of the electric vehicle 105. SRR sensors can include radar sensors that use the 79-GHz frequency band with a 4-GHZ bandwidth, or 1 GHZ bandwidth at 77 GHz, for example. The radar sensor can include or utilize a monolithic microwave integrated circuit ("MIMIC") having, for example, three transmission channels (TX) and four receive channel (RX) to be monolithically integrated. The radar can provide raw data or pre-processed data to the ADAS 115. For example, the radar sensor can provide pre-process information on speed, distance, signal strength, horizontal angle, and vertical angle for each detected object. The raw data radar sensor can provide unfiltered raw data to the ADAS 115 for further processing.

With LIDAR sensors, as an example of the environmental sensors 125, the LIDAR sensors can be placed throughout an exterior of the electric vehicle 105. LIDAR sensor can refer to or include a laser-based system. In addition to the transmitter (laser), the LIDAR sensor system can use a sensitive receiver. The LIDAR sensor can measure distances to stationary as well as moving objects. The LIDAR sensor system can provide three-dimensional images of the detected objects. LIDAR sensors can provide 360 degree all-round visibility that capture spatial images of objects. LIDAR sensors can include infrared LIDAR systems that use Micro-Electro-Mechanical System ("MEMS"), a rotating laser, or a solid-state LIDAR. The LIDAR sensors can recognize light beams emitted as well as reflected from objects. For example, the LIDAR sensors can use detectors that are configured to measure single photons, such as a Single-Photon Avalanche Diode ("SPAD").

The one or more compartment sensors 130 can be used by the various components of the ADAS 115 to acquire environmental data within the passenger compartment of the electric vehicle 105. The data can include any data acquired by the compartment sensor 130 measuring a physical aspect of the passenger compartment of the electric vehicle 105, such as electromagnetic waves (e.g., visual, infrared, violet, and radio waves). The one or more compartment sensors 130 can share or can include any of those of the environmental sensors 125. For example, the one or more compartment sensors 130 can include a camera (e.g., for visual spectrum, infrared, or ultraviolet), a light detection and ranging (LIDAR) sensor, a sonar sensor, an ultrasonic sensor, a tactile contact sensor, a weight scale, a microphone, and biometric sensor (e.g., fingerprint reader and retinal scanner) among others. The one or more compartment sensors 130 can include interfaces with auxiliary components of the electric vehicle 105, such as the temperature controls, seat controls, entertainment system, and GPS navigation systems, among others. The one or more compartment sensors 130 can face or can be directed at a predefined location in the passenger compartment of the electric vehicle 105 to acquire sensory data. For example, some of the one or more compartment sensors 130 can be directed at the location generally in front of the driving controls 120 (e.g., at the driver). Some of the one or more compartment sensors 130 can be directed at a corresponding seat within the passenger compartment of the electric vehicle 105 (e.g., at the other passengers). The one or more compartment sensors 130 can be installed or placed throughout the electric vehicle 105. For instance, some of the one or more compartment sensors 130 can be placed throughout the passenger compartment within the electric vehicle 105.

With cameras, as an example of the compartment sensors 130, multiple cameras can be placed throughout an interior of the electric vehicle 105 and can face any direction (e.g., forward, backward, left, and right). The cameras can include camera systems configured for near ranges, such as in the area up to 4 m. Data acquired from the near range cameras can be used to perform face detection, facial recognition, eye gaze tracking, and gait analysis, among other techniques, of the one or more occupants 110 within the electric vehicle 105. The data acquired from the near range cameras can be used to perform edge detection, object recognition, among other techniques, of any object including the occupants 110 within the electric vehicle 105. Multiple cameras can be used to perform stereo camera techniques. The cameras can provide the data to the ADAS 115 for further processing.

The one or more user interfaces 135 can include input and output device to interface with various components of the electric vehicle 105. The user interface 135 can include a display, such as a liquid crystal display, or active matrix display, for displaying information to the one or more occupants 110 of the electric vehicle 105. The user interface 135 can also include a speaker for communicating audio input and output with the occupants 110 of the electric vehicle 105. The user interface 135 can also include a touchscreen, a cursor control, and keyboard, among others, to receive user input from the occupants 110. The user interface 135 can also include a haptic device (e.g., on the steering wheel or on the seat) to tactilely communicate information (e.g., using force feedback) to the occupants 110 of the electric vehicle 105. The functionalities of the user interfaces 135 in conjunction with the ADAS 115 will be detailed herein below.

The suspension system 140 can control vehicle handling for the electric vehicle 105. The suspension system 140 can connect the wheels to the internal frame 245 of the electric vehicle 105. The suspension system 140 can control directional stability and movement (e.g., pitch, yaw, and roll) of the electric vehicle 105 relative to the driving surface 160 via the wheels while in motion. The suspension system 140 can be a passive suspension system with tires, springs, dampers, and shock absorbers. The suspension system 140 can be an active suspension system with tires and electrically configurable actuators (e.g., a hydraulic actuator) to control the directional stability, damping and movement of the chassis or the internal frame of the electric vehicle 105 (e.g., relative to, or independent of the driving surface 160 via the wheels). The actuation of the suspension system 140 that is an active suspension system can include at least one of the ECUs 205 and can be controlled by the chassis control module 230.

The acceleration system 145 can control the speed of the electric or other vehicle 105 in motion using an engine in the vehicle 105. The engine of the electric or other vehicle 105 can generate a rotation in the wheels to move the vehicle 105 at a specified speed, and at a particular acceleration or deceleration if any. The engine can include an electric, hybrid, fossil fuel powered, or internal combustion engines, or combinations thereof. The rotations generated by the engine may be controlled by an amount of power fed into the engine. The rotations generated by the internal combustion engine can be controlled by an amount of fuel (e.g., gasoline, ethanol, diesel, and liquefied natural gas (LNG)) injected for combustion into the engine. The rotations of the engine of the acceleration system 145 can be controlled by at least one of the ECUs 205 that can be controlled by the vehicle control unit 210 (e.g., via the accelerator pedal of the driving controls 120) and the chassis control module 230.

The brake system 150 can decrease the speed of the electric or other vehicle 105 by inhibiting the rotation of the wheels of the electric vehicle 105. The brake system 150 can include mechanical brakes and can apply friction to the rotation of the wheels to inhibit motion. Examples of mechanical brakes can include a disk brake configured to be forced against the discs of the wheels. The brake system 150 can be electromagnetic and can apply electromagnetic induction to create resistance to the rotation of the wheels thereby inhibiting motion. The brake system 150 can include at least one of the ECUs 205 that can be controlled by the vehicle control unit 210 (e.g., via the brake pedal of the driving controls 120) and the chassis control module 230.

The steering system 155 can control a heading or direction of travel of the electric vehicle 105 by adjusting an angle of the wheels of the electric vehicle 105 relative to the driving surface 160. The steering system 155 can include a set of linkages, pivots, and gears, such as a steering column, a line actuator (e.g., rack and pinion), a tie rod, and a king pin to connect to the wheels of the electric vehicle 105. The steering system 155 can translate rotation of the steering wheel of the driving controls 120 onto the line actuator and the tie rod to adjust the angling of the wheels of the electric vehicle 105. The steering system 155 can include at least one of the ECUs 205 that can be controlled by the vehicle control unit 210 (e.g., via the steering wheel of the driving controls 120) and the chassis control module 230.

The vehicle control unit 210 can control the maneuvering of the electric vehicle 105 through the environment 100 on the driving surface 160. The maneuvering of the electric vehicle 105 by the vehicle control unit 210 can be controlled or set via a steering system, an acceleration system, and a brake system, among other components of the electric vehicle 105. The vehicle control unit 210 can interface the driving controls 120 with the steering system, the acceleration system, and the brake system, among other components of the electric vehicle 105. The driving controls 120 can include a steering wheel to control the steering system 155, an accelerator pedal to control the acceleration system 145, and a brake pedal to control the brake system 150, among others. The steering system 155 can control the direction of travel 165 of the electric vehicle 105 by, for example, adjusting an orientation of the front wheels of the electric vehicle 105. The acceleration system 145 can maintain, decrease, or increase a speed of the electric vehicle 105 along the direction of travel 165, for example, by to adjusting power input into the engine of the electric vehicle 105 to change a frequency or speed of rotations of the one or more wheels of the electric vehicle 105. The brake system 150 can decrease the speed of the electric vehicle 105 along the direction of travel 165 by applying friction to inhibit motion of the wheels. Additional details regarding the functionalities of the acceleration system 145, the brake system 150, and the steering system 155 in the context of the system 200 will be provided below.

The vehicle control unit 210 can have or operate in an autonomous mode or a manual mode to maneuver the electric vehicle 105, among others. In the autonomous mode, the vehicle control unit 210 can use data acquired from the one or more environmental sensors 125 to navigate the electric vehicle 105 through the environment 100. For example, the vehicle control unit 210 can apply pattern recognition techniques, such as computer vision algorithms, to detect a road condition including the driving surface 170 itself (e.g., boundaries and width) and objects in the driving surface 170, and can control steering, acceleration, and application brakes according to the output of the pattern recognition techniques. In the manual mode, the vehicle control unit 210 can rely on user input received via the driving controls 120 (e.g., steering wheel, accelerator pedal, and brake pedal) from the occupant 110 to maneuver to the electric vehicle 105 through the environment 100. For example, under the manual mode, the vehicle control unit 210 can receive and translate user input via the steering wheel, accelerator pedal, or the brake pedal of the driving controls 120 to control the steering, acceleration, and application of the brakes to maneuver the electric vehicle 105. The vehicle control unit 210 can switch between the autonomous mode and the manual mode in response to a user input by the occupant 110. For example, the driver of the electric vehicle 105 can initiate the autonomous mode by pressing a command displayed on a center stack. The vehicle control unit 210 can switch between the autonomous mode and the manual mode as configured or caused by the other components of the ADAS 115. The details of the switching between the autonomous mode and the manual mode by the other components of the ADAS 115 will be detailed herein below.

Under the autonomous mode, the vehicle control unit 210 can automatically control the steering system, the acceleration system, and the brake system to maneuver and navigate the electric vehicle 105. The vehicle control unit 210 can acquire environmental data from the one or more environmental sensors 125. The vehicle control unit 210 can process the environmental data acquired from the environmental sensors 125 to perform simultaneous localization and mapping (SLAM) techniques. The SLAM technique can be performed, for example, using an extended Kalman filter. In performing the SLAM techniques, the vehicle control unit 210 can perform various pattern recognition algorithm (e.g., image object recognition) to identify the driving surface 160 (e.g., boundaries and lanes on the road). The vehicle control unit 210 can also identify one or more objects (e.g., signs, pedestrians, cyclists, other vehicles) about the electric vehicle 105 and a distance to each object from the electric vehicle 105 (e.g., using stereo camera techniques). The vehicle control unit 210 can identify the direction of travel 165, a speed of the electric vehicle 105, and a location of the electric vehicle 105 using the environmental data acquired from the environmental sensors 125.

Based on these identifications and determinations, the vehicle control unit 210 can generate a digital map structure. The digital map data structure (also referred to as a digital map) can include data that can be accessed, parsed or processed by the vehicle control unit 210 for path generation through the environment 100. A three-dimensional dynamic map can refer to a digital map having three dimensions on an x-y-z coordinate plane. The dimensions can include, for example, width (e.g., x-axis), height (e.g., y-axis), and depth (e.g., z-axis). The dimensions can include, for example, latitude, longitude, and range. The digital map can be a dynamic digital map. For example, the digital map can be updated periodically or reflect or indicate a motion, movement or change in one or more objects detected using image recognition techniques. The digital map can also include non-stationary objects, such as a person moving (e.g., walking, biking, or running), vehicles moving, or animals moving. The digital map can detect the amount or type of movement and characterize the movement as a velocity vector having a speed and a direction in the three-dimensional coordinate plane established by the three-dimensional digital map structure.

The digital map can detect the amount or type of movement and characterize the movement as a velocity vector having a speed and a direction in the three-dimensional coordinate plane established by the three-dimensional digital map. The vehicle control unit 210 can update the velocity vector periodically. The vehicle control unit 210 can predict a location of the object based on the velocity vector between intermittent updates. For example, if the update period is 2 seconds, the vehicle control unit 210 can determine a velocity vector at $t_0=0$ seconds, and then use the velocity vector to predict the location of the object at $t=1$ second, and then place the object at the predicted location for an instance of the digital map at $t_1=1$ second. The vehicle control unit 210 can then receive updated sensed data at $t_2=2$ seconds, and then place the object on the three-dimensional digital map at the actual sensed location for $t_2$, as well as update the velocity vectors. The update rate can be 1 Hz, 10 Hz, 20 Hz, 30 Hz, 40 Hz, 50 Hz, 100 Hz, 0.5 Hz, 0.25 Hz, or some other rate for automated navigation through the environment 100.

Using the digital map and SLAM techniques, the vehicle control unit 210 can generate a path for automated navigation through the environment 100 on the driving surface 160. The vehicle control unit 210 can generate the path periodically. The path may include a target direction of travel 165, a target speed of the electric vehicle 105, and a target location of the electric vehicle 105 navigating through the environment 100. The target direction of travel 165 can be defined using principal axes about the electric vehicle 105 (e.g., roll in longitudinal axis, pitch in lateral axis, and yaw in vertical axis). The target speed of the electric vehicle 105 can be defined relative to the current speed of the electric vehicle 105 (e.g., maintain, increase, or decrease). The target location of the electric vehicle 105 can be a location at which the electric vehicle 105 is projected or instructed to proceed to. Based on the generated path, the vehicle control unit 210 can set, adjust, or otherwise control the steering system, the acceleration system, and the brake system. For example, the vehicle control unit 210 can turn the wheels using the steering system toward the target direction or target location. The vehicle control unit 210 can also achieve the target speed for the electric vehicle 105 by applying the accelerator of the acceleration system to increase the speed or by applying the brakes of the brake system to decrease the speed.

Under the manual mode, the vehicle control unit 210 can rely on user input on the driving controls 120 by the occupant 110 to control the steering system, the acceleration system, and the brake system to maneuver and navigate the electric vehicle 105 through the environment 100. As described above, the driving controls 120 can include the steering wheel, the acceleration pedal, and the brake pedal, among others. The vehicle control unit 210 can receive a user input on the steering wheel from the occupant 110 (e.g., turning clockwise for rightward direction and turning counter-clockwise for leftward direction). The vehicle control unit 210 can turn the wheels using the steering system based on the user input on the steering wheel. The vehicle control unit 210 can receive a user input from a force applied on the accelerator pedal. Based on the force on the accelerator pedal by the occupant 110, the vehicle control unit 210 can increase the speed of the electric vehicle 105 by causing the acceleration system to increase electric power to the engine. The vehicle control unit 210 can also receive a user input on the brake pedal. Based on the force applied on the brake pedal by the occupant 110, the vehicle control unit 210 can decrease the speed of the electric vehicle 105 by applying the brakes of the brake system to inhibit motion in the wheels.

The environment sensing module 215 can identify the condition 170 to change the operational mode of the vehicle control unit 210 based on the environmental data acquired from the environmental sensors 125. The condition 170 can correspond to any event in the environment 100 to cause the vehicle control unit 210 to change from the autonomous mode to the manual mode. The condition 170 can correspond to having the occupant 110 to assume manual control of a vehicular function, such as steering, acceleration, or brakes. The vehicle control unit 210 may initially be in the autonomous mode. For example, while driving, the occupant 110 of the electric vehicle 105 may have activated the autonomous mode to automate maneuvering of the electric vehicle 105 through the driving surface 160. The condition 170 can be related to the driving surface 160 in the direction of the travel 165 or independent of the direction of travel 165. As discussed previously, the condition 170 can include a junction (e.g., an intersection, a roundabout, a turn lane, an interchange, or a ramp) or an obstacle (e.g., a curb, construction site, sinkhole, detour, barrier, pedestrians, cyclists, or other vehicles) on the driving surface 160 in the direction of travel 165. The condition 170 can also be communicated to the electric vehicle 105 (e.g., from infrastructure to vehicle). The condition 170 can include a presence of an emergency vehicle (e.g., an ambulance, a fire truck, or a police car) in the vicinity of the electric vehicle 105 (e.g., up to 10 km). The environment sensing module 215 can retrieve, receive, or acquire the environmental data from the one or more environmental sensors 125 periodically to identify the condition 170. The acquisition of the environmental data from the environmental sensors 125 can be 1 Hz, 10 Hz, 20 Hz, 30 Hz, 40 Hz, 50 Hz, 100 Hz, 0.5 Hz, 0.25 Hz, or some other rate.

To identify the condition 170 on the driving surface 160, the environment sensing module 215 can perform various image recognition techniques on the environmental data acquired from the environmental sensors 125. For example, the environment sensing module 215 can receive image data from the cameras placed throughout the exterior of the electric vehicle 105. The environment sensing module 215 can apply edge detection techniques and corner detection techniques to determine the boundaries of the driving surface 160. The edge detection techniques can include a Canny edge detector, a differential edge detector, and a Sobel-Feldman operator, among others. The corner detection techniques can include a Harris operator, a Shi-Tomasi detection algorithm, and a level curve curvature algorithm. Based on the boundaries of the driving surface 160, the environment sensing module 215 can determine a presence of a junction (e.g., intersection, a roundabout, a turn lane, an interchange, or a ramp) in the direction of travel 165 relative to the electric vehicle 105. Using the determination, the environment sensing module 215 can identify a condition type (e.g., intersection, roundabout, turn lane, interchange, or ramp). The environment sensing module 215 can apply object recognition techniques to determine a presence of an obstacle (e.g., a curb, sinkhole, barrier, pedestrians, cyclists, or other vehicles) in the direction of travel 165 relative to the electric vehicle 105. The object recognition techniques can include geometric hashing, scale-invariant feature transform (SIFT), and speeded up robust features (SURF), among others. Based on the object recognition technique, the environment sensing module 215 can identify the condition type (e.g., curb, sinkhole, barrier, pedestrian, cyclist, or other vehicle). The edge detection techniques, the corner detection techniques, and the object recognition techniques can be applied to environmental data from LIDAR sensors, radar sensors, and sonar, among others. Based on the determination of the presence of an object, junction or obstacle for instance, the environment sensing module 215 can identify the condition 170 to change the operational mode of the vehicle control unit 210 from the autonomous mode to the manual mode.

The environment sensing module 215 can also use stereo camera techniques to determine a direction and an distance to the condition 170 from the electric vehicle 105. The direction can be relative to the direction of travel 165. The distance can be calculated from one side of the electric vehicle 105 along the direction of travel 165. For example, if the condition 170 is in front of the electric vehicle 105, the distance can be measured from the front bumper of the electric vehicle 105. The environment sensing module 215 can determine the direction and the distance to the condition 170 from the electric vehicle 105 based on the path generated using the digital map for automated navigation under the autonomous mode. With the determination of the distance to the condition 170, the environment sensing module 215 can determine an estimated time of occurrence of the condition 170. The environment sensing module 215 can identify the speed of the electric vehicle 105 from the environmental data acquired from the environmental sensors 125. Based on speed of the electric vehicle 105 and the distance to the condition 170, the environment sensing module 215 can determine an estimated amount of time (labeled as T on FIG. 1) to the occurrence of the condition 170 from the present.

The environment sensing module 215 can identify the condition 170 communicated from a source within a vicinity of the electric vehicle 105 (e.g., up to 10 km). The environment sensing module 215 can receive an indication of communicated via one of the V2X sensors. The receipt of the indication can be constrained to the transmission distance (e.g., 10 km) around the source of the indication. The source of the indication can include another vehicle, a radio base station, a smartphone, or any other V2X communication capable device. The indication can include a presence of an approaching emergency vehicle (e.g., an ambulance, a fire truck, or a police car), a presence of road outage (e.g., road construction or detour), and a broken down vehicle, among other conditions. For example, the environment sensing module 215 can receive an indication that an emergency vehicle is approaching via the vehicle-to-vehicle sensor. The indication can include an emergency vehicle type, a location of the emergency vehicle, and a speed of the emergency vehicle, among other information. Based on the receipt of the indication, the environment sensing module 215 can identify the condition 170. The environment sensing module 215 can identify a presence of an approaching emergency vehicle as the condition type. The environment sensing module 215 can receive an indication of a road outage (e.g., road closure, or degraded or unnavigable condition, due to flooding, illumination outage, accident scene, landslide, damage, obstruction, and so on) via the vehicle-to-infrastructure sensor. The indication can include a location of the road outage, among other information. Based on the receipt of the indication, the environment sensing module 215 can identify the condition 170. The environment sensing module 215 can identify a presence of the road outage as the condition type.

The environment sensing module 215 can determine a distance to the condition 170 communicated with the electric vehicle 105. The environment sensing module 215 can parse the indication communicated via the V2X sensors to identify the location of the condition 170. The environment sensing module 215 can identify a location of the electric vehicle 105 using the GPS sensor. Based on the location of the electric vehicle 105 and the location included in the indicator, the environment sensing module 215 can determine the distance to the condition 170 from the electric vehicle 105. With the determination of the distance to the condition 170, the environment sensing module 215 can determine an estimated time to occurrence of the condition 170 as well. The environment sensing module 215 can identify the speed of the electric vehicle 105 from the environmental data acquired from the environmental sensors 125. The environment sensing module 215 can determine the distance to the condition 170 from the electric vehicle 105 based on the path generated using the digital map for automated navigation under the autonomous mode. Based on speed of the electric vehicle 105 and the distance to the condition 170, the environment sensing module 215 can determine the estimated time (labeled as T on FIG. 1) to the occurrence of the condition 170.

The environment sensing module 215 can identify the condition 170 within the electric vehicle 105 itself using data acquired from the environmental sensors 125. The condition 170 within the electric vehicle 105 itself can include a low fuel (e.g., less than 10% remaining), low electric charge in battery (e.g., less than 15% remaining), low tire pressure (e.g., less than 30 Psi or 2 Bar), high temperature in engine (e.g., above 200° C.), structural damage (e.g., cracked window or steering bar), or engine malfunction (e.g., broken cooling system), among others. The environmental sensors 125 used to detect or identify the condition 170 within the electric vehicle 105 can include vehicular sensors, such as the tire pressure gauge, fuel gauge, battery capacity measurer, IMU, thermometer, and contact sensor, among others. The environment sensing module 215 can compare the data measured by the vehicular sensors to a defined threshold. Using the comparison of the measurement with the defined threshold, the environment sensing module 215 can identify the condition 170. Based on which vehicular sensor, the environment sensing module 215 can identify the condition type. For example, the environment sensing module 215 can read a tire pressure of less than 25 psi. If the defined threshold for low tire pressure is 30 Psi or less, the environment sensing module 215 can identify the low tire pressure as the condition 170. As the condition 170 is currently ongoing within the electric vehicle 105, the environment sensing module 215 can determine the distance and the time to the condition 170 as null.

The environmental sensing module 215 can calculate or otherwise determine a level of urgency of the condition 170. The level of urgency can indicate or can correlate with an amount of time in which the occupant 110 is to assume manual control of vehicular functions. The level of urgency can indicate or can correlate with the (type of, and other aspects of) condition 107. The level of urgency can be one of a range of numerical value (e.g., real numbers from −1 to 1 or integers from 0 to 100). The environment sensing module 215 can determine the level of urgency based on the estimated distance to the condition 170. The environment sensing module 215 can compare the estimated distance to the condition 170 with a set of defined ranges for the levels of urgency. Each defined range can include a range of distances for the corresponding level of urgency. Based on the estimated distance to the condition 170 matching one of the set of defined ranges, the environment sensing module 215 can set the level of urgency corresponding to the defined range. The environment sensing module 215 can determine the level of urgency based on the estimated time to the condition 170. The environment sensing module 215 can compare the estimated time to the condition 170 with a set of defined ranges for the levels of urgency. Each defined range can include a range of times for the corresponding level of urgency. Based on the estimated time to the condition 170 matching one of the set of defined ranges, the environment sensing module 215 can set the level of urgency corresponding to the defined range and the condition 170.

With the identification of the condition 170, the policy enforcement module 220 can select between the user interface 135 and the chassis controls 240 to present an indication to the occupant 110 to assume manual control of vehicular functions. As discussed above, the presentation of the indication via the user interface 135 can include audio stimuli, visual stimuli, or tactile stimuli within the passenger compartment of the electric vehicle 105. In additional, the chassis controls 240 can refer to the suspension system 140, the acceleration system 145, the brake system 150, and the steering system 155. The presentation of the indication via the chassis control can include force feedback from within the electric vehicle 105. The policy enforcement module 220 can select between the user interface 135 and the chassis controls 240 to present the indication based on the estimated distance to the condition 170, the estimated time to the condition 170, or the level of urgency, among other factors.

By way of illustration, the policy enforcement module 220 can compare the estimated distance to the condition 170 with a threshold distance. The threshold distance can correspond to a distance within which the occupant 110 (e.g., the driver) is expected to assume manual control of vehicular functions in response to the presentation of the indication via the user interface 135 (e.g., audio, video, or tactile stimuli). In response to determining that the estimated distance to the condition 170 is less than the threshold distance, the policy enforcement module 220 can select the user interface 135 to present the indication to assume manual control of vehicular functions. In response to determining that the estimated distance to the condition 170 is greater than the threshold distance for instance, the policy enforcement module 220 can select the chassis control to present the indication to assume manual control of vehicular functions.

The policy enforcement module 220 can compare the estimated time to the condition 170 with a threshold time. The threshold time can correspond to a time within which the occupant 110 (e.g., the driver) is expected to assume manual control of vehicular functions in response to the presentation of the indication via the user interface 135 (e.g., audio, video, or tactile stimuli). In response to determining that the estimated time to the condition 170 is less than the threshold time, the policy enforcement module 220 can select the user interface 135 to present the indication to assume manual control of vehicular functions. In response to determining that the estimated time to the condition 170 is greater than the threshold time for instance, the policy enforcement module 220 can select the chassis control to present the indication to assume manual control of vehicular functions.

The policy enforcement module 220 can compare the level of urgency of the condition 170 with a threshold level. The threshold level can correlate to a distance or time within which the occupant 110 (e.g., the driver) is expected to assume manual control of vehicular functions in response to the presentation of the indication via the user interface 135 (e.g., audio, video, or tactile stimuli). In response to determining that the level of urgency of the condition 170 is less than the threshold level, the policy enforcement module 220 can select the user interface 135 to present the indication to assume manual control of vehicular functions. In response to determining that the level of urgency of the condition 170 is greater than the threshold level for instance, the policy enforcement module 220 can select the chassis control to present the indication to assume manual control of vehicular functions.

In response to selection of the user interface 135, the policy enforcement module 220 can present the indication to the occupant 110 to assume manual control of the vehicular function in advance of the condition 170 via the user interface 135. The policy enforcement module 220 can select the presentation of the indication via the user interface 135 in accordance with an action application policy. The action application policy can be a data structure maintained on the ADAS 115 (e.g., on a database). The action application policy can specify which stimulus types to present as the indication via the user interface 135 to the occupant 110 to assume manual control of the vehicular function. The audio stimulus can include a set of audio signals, each of a defined time duration and an intensity. The visual stimulus can include a set of images or videos, each of a defined color, size, and time duration of display. The tactile stimulus can include an application of a force on the occupant 110, such as vibration or motion of the driving controls 120, seats, the user interface 135, or another component within the electric vehicle 105. Instructions for generating and producing audio, visual, and tactile stimuli can be stored and maintained as data files on the ADAS 115. The action application policy can specify a sequence of stimuli. The sequence of stimuli can enumerate an intensity level and a time duration for the each stimulus. The sequence of stimuli can identify a file pathname for the data files used to generate and produce the audio stimuli, visual stimuli, and tactile stimuli, or any combination thereof. The intensity levels can include volume for audio stimuli, brightness for visual stimuli, and amount of force for tactile stimuli. For example, the action application policy can specify that an audio stimulus of low intensity is played for the first 30 seconds, then another audio stimulus of higher intensity is played for the next 10 seconds, and then a tactile stimulus together with the previous audio stimulus is applied thereafter.

In accordance with the action application policy, the policy enforcement module 220 can present the indication via the user interface 135 to the occupant 110 to assume manual control of vehicular controls. The policy enforcement module 220 can identify the selected sequence of stimuli as specified by the action application policy. The policy enforcement module 220 can find and load the data files corresponding to the sequence of stimuli. Subsequent to loading, the policy enforcement module 220 can initiate generation of the stimuli according to the data files for the sequence of stimuli. For audio stimuli, the policy enforcement module 220 can play the audio stimuli via the speakers within the electric vehicle 105 to indicate to the occupant 110 to assume manual control. For visual stimuli, the policy enforcement module 220 can control lights or render on a display the visual stimuli within the electric vehicle 105 to indicate to the occupant 110 to assume manual control. For tactile stimuli, the policy enforcement module 220 can cause vibration or motion in the seats or steering wheel within the electric vehicle 105 to indicate to the occupant 110 to assume manual control.

Subsequent to initiation, the policy enforcement module 220 can continue presenting the indication via the user interface 135 for the time duration specified by the sequence of stimuli of the action application policy. The policy enforcement module 220 can parse the data files for the generation of the stimuli. By parsing the data files, the policy enforcement module 220 can identify which user interface 135 to output to stimulus to the occupant 110 based on the stimulus type. In response to identifying the stimulus type as audio, the policy enforcement module 220 can identify or select speakers for outputting the audio stimuli. In response to identifying the stimulus type as visual, the policy enforcement module 220 can identify or select displays for outputting the visual stimuli. In response to identifying the stimulus type as tactile, the policy enforcement module 220 can identify or select haptic device for outputting the force (e.g., vibration or motion).

As the indication is presented via the user interface 135, the response detector module 225 can also determine whether the occupant 110 is attentive or inattentive to the condition 170 itself. The response detector module 225 can determine whether the occupant 110 is attentive based on the sensory data acquired form the one or more compartment sensors 130. The occupant 110 may be considered attentive, when the focus of the occupant 110 is determined to be toward at least the driving controls 120. The response detector module 225 can determine whether the occupant 110 is attentive or inattentive to the condition 170 based on a single frame corresponding to one sample of the sensory data acquired from the compartment sensors 130. The response detector module 225 can determine whether the occupant 110 is attentive or inattentive to the condition 170 based on multiple frames corresponding to multiple samples of the sensory data. As discussed above, the sensory data from the compartment sensors 130 may be of the passenger compartment of the electric vehicle 105. For example, the sensory data may include image data taken by cameras directed inward in the passenger compartment of the electric vehicle 105. The response detector module 225 can identify which of the compartment sensors 130 are directed to a predefined region of the passenger compartment within the electric vehicle 105. With the identification of the compartment sensors 130, the response detector module 225 can retrieve, select, or otherwise receive the sensory data from the compartment sensors 130 directed to the predefined region. The predefined region for the driver can generally correspond to a region within the passenger compartment having the driving controls 120, the driver's seat, and the space between. The compartment sensors 130 directed to the predefined region can acquire the sensory data of the occupant 110 corresponding to the driver of the electric vehicle 105. For example, the response detector module 225 can select image data of cameras pointed at the driver's seat in the electric vehicle 105. The predefined region for the passenger can correspond to a region within the passenger compartment outside the region for the driver.

The response detector module 225 can apply various pattern recognition techniques to the sensory data acquired from the compartment sensors 130. To identify the occupant 110 from the sensory data, the response detector module 225 can apply edge detection techniques (e.g., a Canny edge detector, a differential edge detector, and a Sobel-Feldman operator). The occupant 110 can be in the predefined region to which the compartment sensors 130 are directed. The response detector module 225 can identify a region of the sensory data corresponding to the occupant 110 using the edge detection techniques. The response detector module 225 can apply stereo camera techniques on the sensory data acquired from the compartment sensors 130 to construct a three-dimensional model of the occupant 110 in the predefined region within the electric vehicle 105.

With the identification of the occupant 110 from the sensory data, the response detector module 225 can determine whether the occupant 110 is attentive or inattentive to the condition 170 using pattern recognition techniques. Examples of pattern recognition techniques can include object recognition (e.g., geometric hashing, scale-invariant feature transform (SIFT), and speeded up robust features (SURF)). The response detector module 225 can extract one or more features from the sensory data acquired from the compartment sensors 130. The response detector module 225 can maintain a model for recognizing whether the occupant 110 is attentive or inattentive based on the sensory data acquired from the compartment sensors 130. The model may have been trained using a training dataset. The training dataset can include sample sensory data each labeled with the corresponding attentive state (e.g., inattentive or attentive). The training dataset can also include sample features extracted from sensory data each labeled with the corresponding activity type. The sample sensory data may be a single frame (e.g., an image) or multiple frames (e.g., video). For example, a sample image of a person down at a book may be labeled as "inattentive" and a sample image of a person with eyes wide forward may be labeled as "attentive."

Using the trained model, the response detector module 225 can generate a probability of whether the occupant 110 is attentive or inattentive to the condition 170. In generating the probability, the response detector module 225 can compare the features extracted from the sensory data with the labeled features of the training dataset. The response detector module 225 can determine the probability of whether the occupant 110 is attentive or inattentive based on the probability. For example, in response to determining that the probability that the occupant 110 is inattentive is greater than the probability that the occupant 110 is attentive, the response detector module 225 can determine that the occupant 110 is inattentive. Conversely, in response to determining that the probability that the occupant 110 is inattentive is less than the probability that the occupant 110 is attentive, the response detector module 225 can determine that the occupant 110 is attentive.

In determining whether the occupant 110 is attentive or inattentive to the condition 170, the response detector module 225 can also use other pattern recognition techniques to extract the one or more features from the sensory data acquired from the compartment sensors 130. For example, the response detector module 225 can use facial detection to identify a face of the occupant 110 from the sensory data. The response detector module 225 can apply facial recognition techniques to identify one or more facial features (e.g., eyes, nose, lips, eyebrow, and cheeks) on the identified face of the occupant 110 from the sensory data from the compartment sensors 130. The response detector module 225 can also determine one or more properties for each feature identified from the occupant 110 using the facial recognition techniques. The training dataset used to train the model can include the one or more facial features and the one or more properties for each feature labeled as correlated with the attentive state. Using the one or more properties for each feature and the trained model, the response detector module 225 can determine the activity type (e.g., sleeping, operating a personal device, communicating with another occupant) of the occupant 110. The response detector module 225 can also use eye gaze tracking to identify one or more characteristics of the eyes of the identified face of the occupant 110. The training dataset used to train the model can include one or more eye characteristics labeled as correlated with the attentive state. Using the one or more identified eye characteristics and the trained model, the response detector module 225 can determine the attentive state of the occupant 110.

The response detector module 225 can determine whether the occupant 110 is attentive or inattentive to the condition 170 based on user interactions with auxiliary components of the electric vehicle 105, such as temperature controls, seat controls, entertainment system, and GPS navigation systems. The response detector module 225 can receive or identify a user interaction by the occupant 110 on the components of the electric vehicle 105. The response detector module 225 can identify which auxiliary component the user interaction corresponds to. The response detector module 225 can use the user interactions on the identified auxiliary component to adjust or set the probabilities, prior to identifying the attentive state with the highest probability. For example, the user interaction with a recline button on the seat controls may correspond to the occupant 110 being inattentive. In this example, the response detector module 225 can decrease the probability that the occupant 110 is attentive based on the user interaction with the recline button on the seat controls.

In addition, during the presentation of the indication via the user interface 135, the response detector module 225 can monitor for user input on the driving controls 120 (e.g., the steering wheels, accelerator pedal, and brake pedal). In response to the initiation of the presentation of the indication via the user interface 135, the response detector module 225 can maintain a timer to identify a time elapsed since the presentation of the indication via the user interface 135. Based on the comparison between the elapsed time, the response detector module 225 can determine whether the occupant 110 is attentive or inattentive to the audio stimuli, visual stimuli, or tactile stimuli outputted via the user interface 135. The response detector module 225 can compare the elapsed time with a threshold time. The response detector module 225 can determine the threshold time using the estimated time to the condition 170. For example, the response detector module 225 can set the threshold time to a predefined proportion (e.g., 10-25%) of the estimated time to the condition 170. In response to determining that the elapsed time is greater than the threshold time, the response detector module 225 can determine that the occupant 110 is inattentive to the presentation of the indication via the user interface 135. On the other hand, in response to determining that the elapsed time is less than the threshold time, the response detector module 225 can wait for the user input on the driving controls 120. The response detector module 225 can detect the user input on the driving controls 120 prior to the elapsed time exceeding the threshold time. In response to detecting the user input prior to the threshold time, the response detector module 225 can determine that the occupant 110 is assuming manual control of vehicular functions. In addition, the response detector module 225 can determine that the occupant 110 is attentive to the presentation of the indication. The response detector module 225 can determine that the occupant 110 is attentive to the condition 170 itself. The vehicle control unit 210 can also enter the manual mode from the autonomous mode in response to the detection of the user input on the vehicle controls 120.

Additionally, the policy enforcement module 220 can present the indication to the occupant 110 to assume manual control of the vehicular function in advance of the condition 170 via the chassis controls 240, responsive to the identification of the condition 170. As described previously, the chassis controls 240 can include the suspension system 140, the acceleration system 145, the brake system 150, and the steering system 155. The policy enforcement module 220 can initiate presenting the indication to the occupant 110 via the chassis controls 240, in response to the selection of the chassis controls 240 based on the estimated distance to the condition 170, the estimated time to the condition 170, and the level of urgency, as discussed above. The presentation of the indication via the user interface 135 can occur prior to the presentation of the indication via the chassis controls 240. The policy enforcement module 220 can initiate presenting the indication the chassis controls 240 in response to determining that the occupant 110 is inattentive to the condition 170. The policy enforcement module 220 can also initiate presenting the indication via the chassis controls 240 responsive to determining that the occupant 110 is inattentive to the audio stimuli, visual stimuli, or tactile stimuli outputted via the user interface 135.

In presenting the indication to the occupant 110 to assume manual control via the chassis controls 240, the policy enforcement module 220 can change an operation mode of the chassis control module 230. The policy enforcement module 220 can cause the chassis control module 230 to mechanically induce an internal force feedback from within the electric vehicle 105 via the chassis controls 240 to present the indication to assume manual control. The mechanical inducement of the internal force feedback can be in accordance with one or more of a set of defined feedback patterns selected by the chassis control module 230. The set of defined feedback patterns can be maintained on the ADAS 115 (e.g., on a database) in the form of a data structure. The set of defined feedback patterns can be used to replicate or simulate an external force feedback exerted by conditions of the driving surface 160 from outside the electric vehicle 105 propagated throughout the electric vehicle 105. For example, the set of defined feedback patterns can simulate a rumble strip, a Bott's dots, a speed bump, a raised pavement marker, and a gravel road, among other road conditions. The set of defined feedback patterns can be exaggerated or emphasized relative to that typically caused by a corresponding road condition, to improve recognition of the corresponding road condition, and to distinguish from other road conditions.

Each defined feedback pattern can specify a chassis control type to actuate, an actuation type, an intensity of actuation, a time allocation of the actuations via the chassis controls 240, a total time duration of the pattern, and an associated condition. The chassis control type to actuate can specify one or more of the chassis controls 240 to actuate (e.g., the suspension system 140, the acceleration system 145, the brake system 150, and the steering system 155). The actuation type and the actuation intensity can specify the manner in which to mechanically induce the internal force feedback. For suspension system 140, the actuation type can specify a positive inducement or a negative inducement at one or more of the wheels connected to the respective actuators. The actuation intensity can specify an amount of the inducement or perturbation at one or more the wheels. The positive inducement can specify a vertical inclination or raising of the internal frame 245 about the specified one or more wheels (e.g., left-front, right-front, left-rear, and right-rear wheels). The actuation intensity can specify a height or angle of the vertical inclination. The negative inducement can specify a vertical declination or height reduction of the internal frame 245 about the specified one or more wheels connected to the respective actuators. The actuation intensity can specify a height or angle of the vertical declination. For the acceleration system 145, the actuation type can specify an increase (or decrease) in the input electric energy or fuel into the engine to increase (or decrease) the speed of the electric vehicle 105, and change a sound of the engine (e.g., corresponding to acceleration or deceleration). The actuation intensity can specify an amount of increase in the speed of the electric vehicle 105. For the brake system 150, the actuation type can specify an application of the brakes to inhibit motion in the wheels to decrease the speed of the electric vehicle 105. The actuation type can specify a shifting of the gearbox to change the speed of the vehicle and engine sound (e.g., due to "revving" or rotation rate). The actuation intensity can specify an amount of decrease in the speed of the electric vehicle 105. For the steering system 155, the actuation type can specify whether to change the heading of the electric vehicle 105 using the steering system 155. The actuation intensity can specify an angle (e.g., a camber angle) of the direction of the wheels of the electric vehicle 105. The time allocation can specify an amount of time each actuation type is to be applied via the chassis controls 240. The time duration can specify an amount of time the entire defined feedback pattern is to be applied via the chassis controls 240. The associated condition can specify the condition 170 in which the defined feedback pattern is to be selected. The associated condition for the defined feedback pattern can specify the one or more parameters related to the condition 170, such as the direction of the condition 170, the distance to the condition 170, the estimated time to the condition 170, the condition type, or the level of urgency.

The policy enforcement module 220 can select one or more of the set of predefined feedback patterns based on the condition 170. The selected predefined feedback pattern can convey the identified condition 170 to the occupant 110 within the electric vehicle 105. The policy enforcement module 220 can select one or more of the set of predefined feedback patterns based on one or more parameters related to the condition 170. The parameters related to the condition 170 can include the direction of the condition 170, the distance to the condition 170, the estimated time to the condition 170, the condition type, and the level of urgency, among other factors. For example, when the condition 170 is determined to be toward the left relative to the direction of travel 165, the policy enforcement module 220 can select the predefined feedback pattern that specifies shaking of the suspension system 140 on the left-hand side of the electric vehicle 105.

The policy enforcement module 220 can traverse through the set of predefined feedback patterns to compare the specifications of each predefined feedback with the parameters of the condition 170. The policy enforcement module 220 can determine a match between the specifications of the predefined feedback pattern with one or more of the parameters of the condition 170. For example, the policy enforcement module 220 can determine a match between the level of urgency for the identified condition 170 with the level or urgency specified by the predefined feedback pattern. With comparisons of time, the policy enforcement module 220 can determine a match between the specifications of the predefined feedback pattern and the parameters of the condition 170, in response to determining that the total time duration of the feedback pattern is less than the estimated time to the occurrence of the condition 170 by a predefined feedback pattern. Responsive to determining the match, the policy enforcement module 220 can select the predefined feedback pattern for use in actuating the chassis controls 240. With the selection of the one or more predefined feedback patterns, the policy enforcement module 220 can cause the chassis control module 230 to change operation modes and to mechanically induce internal force feedback (e.g., chassis or other electric vehicle element vibration) using the predefined feedback patterns.

The chassis control module 230 can control actuation of one or more of the suspension system 140, the acceleration system 145, the brake system 150, and the steering system 155. In controlling the actuation, the chassis control module 230 can interface with the ECUs 205 corresponding to the suspension system 140, the acceleration system 145, the brake system 150, and the steering system 155. By interfacing with the ECUs 205, the chassis control module 230 can measure or identify metrics of the chassis controls 240. For example, the chassis control module 230 can measure a movement of the springs, dampers, or actuators of the suspension system 140 via the ECUs 205. The chassis control module 230 can measure a rotation rate of the engine and the speed of the electric vehicle 105 through the acceleration system 145. The chassis control module 230 can measure an amount of force or inducement exerted by the brakes of the brake system 150. The chassis control module 230 can measure an angle (e.g., camber angle) of the wheels of the electric vehicle 105. The chassis control module 230 can operate in a normal mode or an escalation mode. The chassis control module 230 can also interface with the policy enforcement module 220 to switch between the operational modes of normal mode. In general, the chassis control module 230 can operate under the normal mode in response to a lack of the condition 170 to have the occupant 110 assume manual control of vehicular functions. The chassis control module 230 can operate under the escalation mode to alert the occupant 110 to assume manual control of vehicular functions.

Under the normal mode, the chassis control module 230 can actuate the suspension system 140, the acceleration system 145, the brake system 150, and the steering system 155 of the chassis controls 240 to react to (e.g., reduce or allow) the external force feedback from outside the electric vehicle 105. The external force feedback can propagate through the electric vehicle 105 to the occupant 110. The external force feedback can originate from protrusions (e.g., bumps), indents (e.g., potholes), or other features on the driving surface 160, and can spread through the electric vehicle 105 via the wheels, the suspension system 140, and the internal frame 245. In reacting to the external force feedback from outside the electric vehicle 105, the chassis control module 230 can perform corrective measures to reduce or allow the external force feedback to propagate through the electric vehicle 105. The corrective measures can serve to stabilize the directional stability (e.g., pitch, yaw, and roll) of the electric vehicle 105 in response to disturbances along the driving surface 160 as the electric vehicle 105 is in motion. Using the measurements acquired from the chassis control 240, the chassis control module 230 can determine the corrective measures to apply to the chassis controls 240 to reduce or allow the external force feedback. The chassis control module 230 can react to the external force feedback originating from the driving surface 160 by reducing the external force feedback. For example, an external force feedback may have originated from a speed bump on the driving surface 160, causing movement of springs in the suspension system 140. Based on the measured movement of the shock absorbers and springs in the suspension system 140, the chassis control module 230 can determine an amount of force to exert via the actuators to reduce the movement of the springs of the suspension system 140. The chassis control module 230 can react to the external force feedback originating from the driving surface 160 by allowing the external force feedback. In another example, an external force feedback may have originated from a pothole on the driving surface 160, resulting in the suspension system 140 (e.g., the shock absorbers) contact a portion of a bottom surface of the internal frame 245. The chassis control module 230 can at least partially allow the external force feedback to propagate through the electric vehicle 105, and then determine an amount of force to exert to counteract the movement of the suspension system 140. In both scenarios, the amount of force exerted may partially reduce the amount of movement initially exerted by the external force feedback. In accordance to the determined corrective measures, the chassis control module 230 can actuate the suspension system 140, the acceleration system 145, the brake system 150, and the steering system 155 to react to the disturbance propagating from the driving surface 160 by reducing or allow at least in part the external force feedback.

Under the escalation mode, the chassis control module 230 can mechanically induce the internal force feedback from within the electric vehicle 105 via the chassis control. As discussed above, the mechanical inducement of the internal force feedback can be used to alert the occupant 110 to assume manual control of vehicular functions (e.g., hold the steering wheel or press on the accelerator pedal or brake pedal). In contrast to the external force feedback originating from outside the electric vehicle 105, the internal force feedback can originate from within the electric vehicle 105 via the actuation of one or more of the chassis controls 240. In addition, whereas the origin of an external force feedback may be constrained to the suspension system 140, the origin of the internal force feedback may be from any one of the suspension system 140, the acceleration system 145, the brake system 150, or the steering system 155, e.g., from components within the vehicle. The chassis control module 230 can actuate the chassis controls 240 to mechanically induce the internal force feedback be in accordance with the defined feedback patterns to convey the identified condition 170 to the occupant 110. By mechanically inducing the internal force feedback in accordance with the defined feedback patterns, the chassis control module 230 can simulate road conditions on the driving surface 160, such as the rumble strip, Bott's dots, speed bump, raised pavement marker, and gravel road, among others.

To actuate the chassis controls 240 in accordance with the predefined feedback patterns, the chassis control module 230 can parse the defined feedback patterns selected by the policy enforcement module 220 to identify the one or more specifications of each defined feedback pattern. By parsing, the chassis control module 230 can identify the chassis control type, the actuation type, the actuation intensity, the time allocation, the total time duration of the pattern. The chassis control module 230 can select the one or more chassis controls 240 to actuate corresponding to the specified chassis control types of the defined feedback patterns. With the selection of the chassis controls 240, the chassis control module 230 can generate a command for each chassis control 240 based on the actuation type and the actuation intensity. The command can specify the actuation type and the actuation intensity to be performed by the respective chassis control 240 (e.g., the suspension system 140, the acceleration system 145, the brake system 150, and the steering system 155). The command may be in a format compatible for the ECUs 205 corresponding to the respective chassis controls 240. The chassis control module 230 can relay the command over to the ECUs 205 for the corresponding chassis controls 240. The chassis control module 230 can maintain a timer to measure a time elapsed since initiation of the command. The chassis control module 230 can apply the command for a duration of the time allocation set by the defined feedback pattern to cause the chassis control 240 to perform the actuation type and the actuation intensity for the duration. The chassis control module 230 can repeat the functionality of generating commands to relay to the ECUs 205 of the corresponding chassis controls 240 throughout the total time duration as specified by the defined feedback pattern. In response to receipt of the command, the recipient chassis control 240 can perform the actuation specified in the command. The details of the functionalities of the suspension system 140, the acceleration system 145, the brake system 150, and the steering system 155 while in the chassis control module 230 is in the escalation mode are explained herein below.

With the receipt of the command, the suspension system 140 can control the actuator to control the vertical inclination or declination of the electric vehicle 105 about the specified wheel. As discussed above, the suspension system 140 can include the wheels, springs, dampers, shock absorbers, and hydraulic actuators to control directional stability, damping and movement of the chassis or the internal frame of the electric vehicle 105. The suspension system 140 can identify the one or more wheels of the electric vehicle 105 specified by the actuation type in the command. For each identified wheel, the suspension system 140 can identify the height or angle of the vertical inclination about the wheel as specified by the actuation intensity in the command. The suspension system 140 can calculate or determine an amount of force to be exerted on the wheel at the identified wheel to attain the height or the angle of the vertical inclination as specified by the command. The determination of the amount of force to be exerted on the wheel can be based on the measurement of the movement of springs, dampers, and actuator of the suspension system 140 in response to the external force feedback. Using the determined amount of force, the suspension system 140 can control the actuators connected to the one or more wheels to perform positive inducement to attain the vertical inclination or negative inducement to attain vertical declination about the wheel.

In response to receiving the command, the acceleration system 145 (which can include a gearbox system for example) can regulate the rate of rotation in the wheels to control the speed of the electric vehicle 105. As described above, the acceleration system 145 can control the speed of the electric vehicle 105 in motion using the engine of the electric vehicle 105. The acceleration system 145 can identify whether to increase the input fuel or electric power into the engine to raise the speed of the electric vehicle 105 from the actuation type specified in the command. Upon determining that the actuation type specifies to increase the input fuel or electric power into the engine, the acceleration system 145 can identify the amount of increase in the speed of the electric vehicle 105 from the actuation intensity of the command. Based on the amount of the increase in the speed, the acceleration system 145 can calculate or determine an amount of input fuel or electric power into the engine to attain the increase in the speed of the electric vehicle 105. The determination of the amount of input fuel or electric power can be based on a current measured speed of the electric vehicle 105 or the rate of rotation in the engine. Using the determined amount of input fuel or electric power, or by shifting a gearbox assembly of the vehicle, the acceleration system 145 can control the rate of rotation in the engine of the electric vehicle 105, e.g., to attain a change in speed (and corresponding engine vibrations and sound for instance).

Responsive to the receipt of the command, the brake system 150 can inhibit motion in the wheel to decrease the speed of the electric vehicle 105. As described above, the brake system 150 can decrease the speed of the electric vehicle 105 in motion by inhibiting rotation of the wheels. The brake system 150 can identify whether to apply the brakes (e.g., using friction or electromagnetic force) to inhibit motion in the wheels to decrease the speed of the electric vehicle 105 from the actuation type specified in the command. With the identification that the actuation type specifies to apply the brakes, the brake system 150 can identify the amount of decrease in the speed of the electric vehicle 105 from the actuation intensity of the command. Based on the amount of the decrease in the speed, the brake system 150 can calculate or determine an amount of force to apply via the brakes to attain the decrease in the speed of the electric vehicle 105. The determination of the amount of force can be based on a current measured speed of the electric vehicle 105. Using the determined amount of force, the brake system 150 can apply the brakes to inhibit motion in the wheels of the electric vehicle 105 to attain the decrease in speed. Responsive to the receipt of the command, the brake system 150 can apply the brakes by throttling the brakes in a certain pattern or manner, such as by controlling an antilock braking system (ABS) of the vehicle. This can cause a characteristic force feedback (including corresponding sounds) to an occupant of the vehicle 105.

With the receipt of the command, the steering system 155 can control the heading of the electric vehicle 105 by adjusting the angles of the wheels of the electric vehicle 105 relative to the driving surface 160. As described above, the steering system 155 set of linkages, pivots, and gears, such as a steering column, a line actuator (e.g., rack and pinion), a tie rod, and a king pin to control angle of the wheels of the electric vehicle 105. The steering system 155 can identify whether to change the heading of the electric vehicle 105 using the steering system 155 based on the actuation type specified in the command. With the identification that the actuation type specifies to change the heading of the electric vehicle 105, the steering system 155 can identify the angle of the direction of the wheels (e.g., the front wheels) of the electric vehicle 105 as specified by the actuation intensity. The steering system 155 can identify a current angle of the wheels of the electric vehicle 105. The steering system 155 can calculate or a determine a difference between the current angles and the angles of the wheels as specified in the actuation intensity. The steering system 155 can adjust the angles of the wheels based on the difference in angles to attain the specified heading, thereby changing the direction of travel 165 of the electric vehicle 105. The steering system 155 can control the various components (e.g., linkages, pivots, and gears) to adjust heading of the electric vehicle 105.

With the chassis control module 230 in the escalation mode, the response detector module 225 can maintain the timer to measure and identify a time elapsed since the mechanical inducement of the internal force feedback via chassis controls 240. The timer may be the same as the time used to measure the time elapsed since the presentation of the indication via the user interface 135. The response detector module 225 can compare the elapsed time with a handover-critical threshold time. The handover-critical threshold time here can represent an ultimate time at which the occupant 110 should assume manual control of the vehicular functions prior to the occurrence of the condition 170. The response detector module 225 can set the handover-critical threshold time based on the estimated time to the occurrence of the condition 170. For example, the response detector module 225 can set the handover-critical threshold time to a fixed proportion (e.g., 50-75%) of the estimated time to the occurrence of the condition 170.

In this manner, the chassis control module 230 can actuate the chassis controls 240 to mechanically induce the internal force feedback from within the electric vehicle 105. As the force may be physically felt by the occupants 110 throughout the passenger compartment of the electric vehicle 105, the probability that the occupant 110 is brought to attentiveness may be increased. Furthermore, with the mechanical inducement of the internal force feedback performed in accordance to the force feedback pattern, the occupant 110 may be informed of the nature of the condition 170 as well. As a result, the HCI between the occupants 110 with the electric vehicle 105 may be enhanced in comparison to electric vehicles 105 that are restricted to presenting audio, visual, and tactile stimuli within the passenger compartment. The general utility of the electric vehicle 105 can also be improved. In particular, the operability and efficiency of the switching between the autonomous mode and the manual mode in the vehicle control unit 210 may be amplified. Additionally, consumption of computing resources and electric power may be prevented from being wasted in attempts to grab the attention of the occupants 110 using audio, visual, or tactile stimuli.

The response detector module 225 can determine that the elapsed time since the initiation of the mechanical inducement of the internal force feedback is less than or equal to the handover-critical threshold time. While the elapsed time is less than the threshold time, the response detector module 225 can continue to monitor for user input on the driving controls 120 (e.g., the steering wheels, accelerator pedal, and brake pedal). The response detector module 225 can detect the user input on the driving controls 120 prior to the elapsed time exceeding the handover-critical threshold time. In response to detecting the user input prior to the handover-critical threshold time, the response detector module 225 can determine that the occupant 110 is assuming manual control of vehicular functions. In addition, the policy enforcement module 220 can return, revert, or otherwise cause the chassis control module 230 to change from the escalation mode to the normal mode. In response to the assumption of manual control, the vehicle control unit 210 can change the operational mode from the autonomous mode to the manual mode.

Within the handover-critical threshold time, the policy enforcement module 220 can switch over from one predefined feedback pattern to the next predefined feedback pattern using the timer. Using the timer, the policy enforcement module 220 can determine a time elapsed since the initiation of the mechanical inducement of the internal force feedback using the currently applied defined feedback pattern. The policy enforcement module 220 can compare the elapsed time to the total time duration as specified by the currently induced defined feedback pattern. In response to determining that the elapsed time is less than the total time duration, the policy enforcement module 220 can continually cause the chassis control module 230 to mechanically induce the internal force feedback in accordance with the current defined feedback pattern. In contrast, responsive to determining that the elapsed time is greater than the total time duration, the policy enforcement module 220 can cease the chassis control module 230 to mechanically induce in accordance to the current defined feedback pattern. The policy enforcement module 220 can identify the next selected defined feedback pattern for the identified condition 170. The next selected defined feedback pattern can include specifications different from the previous defined feedback pattern. For example, the next selected defined feedback pattern can be used to mechanically induce the internal force feedback through another chassis control 240. With the identification, the policy enforcement module 220 can cause the chassis control module 230 to mechanically induce the internal force feedback in accordance with the next selected defined force feedback pattern.

Conversely, the response detector module 225 can determine that the elapsed time since the mechanical inducement of the internal force feedback is greater than the handover-critical threshold time. Responsive to determining that the elapsed time is greater than the handover critical threshold time, the policy enforcement module 220 can initiate an automated countermeasure procedure to transition the electric vehicle 105 into a stationary state. To initiate the automated countermeasure procedure, the policy enforcement module 220 can invoke the vehicle control unit 210 to navigate the electric vehicle 105 to the stationary state using the environmental data acquired by the environmental sensors 125. The vehicle control unit 210 may still be in autonomous mode, as the occupant 110 has not assumed manual control of the vehicular function. Based on the digital map data structure generated using the environmental data from the environmental sensors 125, the vehicle control unit 210 can identify a location of the condition 170. Using the location of the condition 170, the vehicle control unit 210 can identify a location to transition the electric vehicle 105 to the stationary state. For example, the location for the stationary state may include a shoulder or a stopping lane on the side of the road. The location for the stationary state may be closer to the current location of the electric vehicle 105 than the location of the condition 170.

Based on the current location of the electric vehicle 105 and the location for the stationary state in conjunction with the previously described SLAM techniques, the vehicle control unit 210 can generate a path to the location for the stationary state. The path may include a target direction of travel 165, a target speed of the electric vehicle 105, and the location for the stationary state. The vehicle control unit 210 can apply object recognition techniques to determine a presence of an obstacle (e.g., a curb, sinkhole, barrier, pedestrians, cyclists, or other vehicles) in between the current location and the location for the stationary state. The object recognition techniques can include geometric hashing, scale-invariant feature transform (SIFT), and speeded up robust features (SURF), among others. Based on the obstacles detected using the object recognition technique, the vehicle control unit 210 can change the path to the location for the stationary state. Based on the generated path, the vehicle control unit 210 can set, adjust, or otherwise control the steering system, the acceleration system, and the brake system. For example, the vehicle control unit 210 can turn the wheels using the steering system toward the target direction or target location. The vehicle control unit 210 can also achieve the target speed for the electric vehicle 105 by applying the accelerator of the acceleration system 145 to increase the speed, shifting a gearbox of the vehicle 105, or by applying the brakes of the brake system 150 to decrease the speed. In response to determining that the electric vehicle 105 is at the target location, the vehicle control unit 210 can apply the brakes of the brake system 150 to maintain the stationary state.

While the chassis control module 230 operates in the escalation mode to mechanically induce internal force feedback via the chassis controls 240, the component coordination module 235 can cause the ECUs 205 to maintain normal or default operations. In response to the change in the operation mode of the chassis control module 230 to the escalation mode, the component coordination module 235 can send or relay a command to maintain normal or default operations to the ECUs 205. The component coordination module 235 can identify a subset of ECUs 205 not interfaced with the policy enforcement module 220 and the chassis control module 230. The component coordination module 235 can relay the command to each in the subset of ECUs 205. Without the instruction to maintain normal or default operations, such ECUs 205 (e.g., telematics ECUs, entertainment ECUs, passenger comfort ECUs, and battery management ECUs) can perform countermeasures in response to the internal force feedback mechanically induced by the chassis controls 240. The countermeasures performed by some ECUs can diminish the mechanical inducement of the internal force feedback caused by the chassis control module 230 while in the escalation mode. For example, a battery management ECU can cut or reduce power to the engine to counteract the surge in electric power caused by the chassis control module 230 while in the escalation mode. By maintaining the ECUs 205 in normal or default mode, the full extent of the internal force feedback may be felt by the occupants 110 in the electric vehicle 105. Furthermore, the ECUs 205 can continue to function as previously while the chassis control module 230 is in the normal mode.

Figure 3:
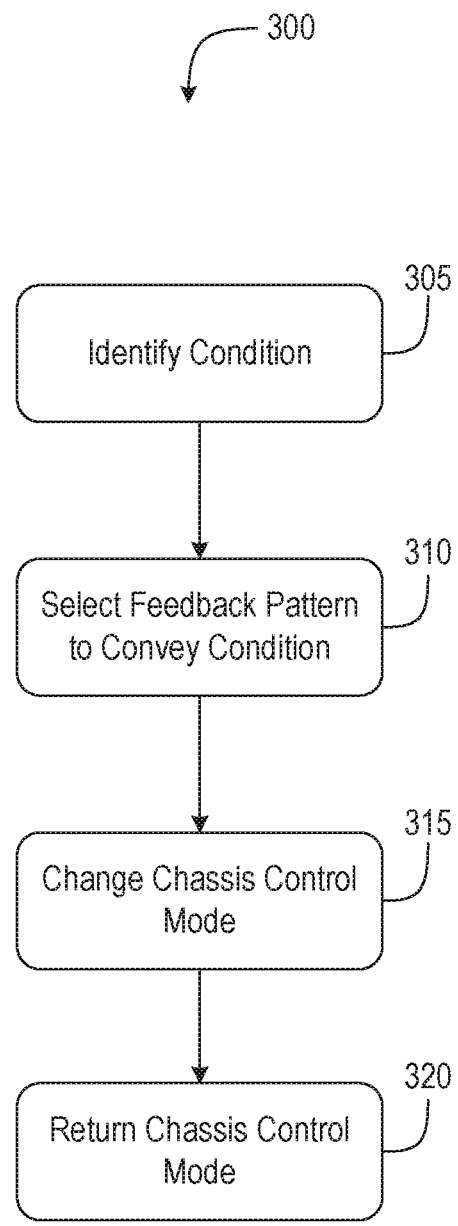
FIG. 3 is a flow diagram of an example method of alerting occupants in vehicles to assume manual control of vehicular functions.

FIG. 3 depicts a flow diagram of an example method 300 of alerting occupants in electric vehicles to assume manual control of vehicular functions. The operations of the method 300 can be implemented or performed by the ADAS 115 as detailed herein above in conjunction with FIGS. 1 and 2 or the computing system 400 as described below in conjunction with FIG. 4, or any combination thereof. For example, the functionalities of the method 300 can be performed on the ADAS 115 (data processing system 115), distributed among the one or more ECUs 205 as detailed herein in conjunction with FIGS. 1 and 2. A data processing system (e.g., the ADAS 115) can identify a condition (305). The data processing system 115 can select a feedback pattern to convey the condition (310). The data processing system (e.g., ADAS 115) can change chassis control mode (315). The data processing system 115 can return the chassis control mode (320).

The data processing system 115 can identify a condition (305). The data processing system 115 can identify the condition to have an occupant within the electric vehicle assume manual control of a vehicular function from autonomous operation. The data processing system 115 can identify the condition to change from an autonomous mode to a manual mode, from environmental data acquired from sensors about an electric vehicle. The data processing system 115 can identify a type of the condition, and any other aspects of the condition (e.g., a time or distance away from affecting or impacting the electric vehicle, and a level of urgency of the condition). The condition can cause a vehicle control unit of the electric vehicle to change from an autonomous mode to a manual mode. The condition can be related to a driving surface upon which the electric vehicle is maneuvering, an approaching object or obstacle or a road outage, and can be communicated to the electric vehicle itself. The data processing system 115 can apply various pattern recognition techniques to identify the condition from the environmental data.

The data processing system 115 can select a feedback pattern to convey the condition (310). A sensor 125 disposed in the electric vehicle 105 can acquire sensory data within the electric vehicle 105. A response detector module 225 executing on the data processing system 115 can determine that the occupant is inattentive to the identified condition, based on the sensory data acquired from the sensor 125. The data processing system 115 can select a feedback pattern responsive to the identified condition, and responsive to the determination that the occupant is inattentive to the identified condition. The data processing system 115 can select a feedback pattern corresponding to, recognizable for, or unique to the condition. The data processing system 115 can select a feedback pattern from a plurality of define feedback patterns. The data processing system 115 can select a feedback pattern corresponding to the type or other aspect (e.g., level of urgency) of the condition.

In anticipation of the condition, the data processing system 115 can select the feedback pattern for a mechanical inducement of an internal force feedback from within the electric vehicle 105. For instance, an environment sensing module 215 of the data processing system 115 can determine an estimated time or a level of urgency to have the occupant assume the manual control of the vehicular function. A policy enforcement module 220 can select one of the plurality of defined feedback patterns to mechanically induce the internal force feedback based on the estimated time or the level of urgency. The mechanical inducement of the internal force feedback can be caused by an inducement of at least one of a suspension system 140, an acceleration system 145, a brake system 150, and a steering system 155 in the electric vehicle 105.

Each feedback pattern can be associated with a particular condition. Based on the association, the data processing system 115 can select the feedback pattern. For example, a policy enforcement module 220 of the data processing system 115 can select one of the plurality of defined feedback patterns corresponding to the identified condition. A policy enforcement module 220 of the data processing system 115 can cause, responsive to the determination that the occupant is inattentive, a chassis control module 230 of the vehicle 105 to control actuation of at least one of the suspension system 140, the acceleration system 145, the brake system 150, and the steering system 155 in accordance to the one of the plurality of defined feedback patterns.

The data processing system 115 can change chassis control mode (315). The data processing system 115 can cause the chassis control 240 of the electric vehicle 105 to change from a normal mode to an escalation mode. The data processing system 115 can determine (e.g., based on the acquired sensory data) that the occupant is inattentive to at least one of an audio alert, an audiovisual alert, or a tactile alert indicative of the identified condition. The data processing system 115 can cause, responsive to the determination that the occupant is inattentive, the chassis control module 230 to change from the normal mode to the escalation mode. The data processing system 115 can cause the chassis control 240 of the electric vehicle 105 to change from a normal mode to an escalation mode, responsive to the identified condition, and responsive to the determination that the occupant is inattentive to the identified condition.

The chassis control 240 can control actuation of at least one of the suspension system 140, the acceleration system 145 (e.g., including gearbox assembly), the brake system 150, and the steering system 145. While in the normal mode, the chassis control 240 can control actuation to react to, reduce, or allow an external force feedback received from outside the electric vehicle 105 to propagate through the electric vehicle 105. While in the escalation mode, the chassis control 240 can control actuation to mechanically induce the internal force feedback from within the electric vehicle, which can be independent of any concurrent external force feedback received from outside the electric vehicle.

The data processing system (ADAS 115) can select and use one of a plurality of defined feedback patterns as the mechanically induced internal force feedback to convey the identified condition to the occupant. The chassis control 240 can control actuation in accordance to the selected feedback pattern to convey the identified condition to the occupant of the electric vehicle. The data processing system 115 can simulate, via mechanical inducement of the internal force feedback in accordance with the one of the plurality of defined feedback patterns, a road condition including at least one of a rumble strip, a speed bump, a raised pavement marker, and a gravel road. A component coordination module 235 executing on the data processing system 115 can cause one or more electronic control units (ECUs) 205 disposed in the electric vehicle 105 to maintain normal operations while the internal force feedback is mechanically induced by the chassis control module 230 in the escalation mode.

The data processing system (ADAS 115) can return the chassis control mode (320). The data processing system 115 can monitor for user interaction with driving controls of the electric vehicle 105, such as a steering wheel, an accelerator pedal, or a brake pedal. For instance, a response detector module 225 executing on the data processing system 115 can determine that the occupant is assuming manual control of the vehicular function (e.g., via user interaction with driving controls of the electric vehicle 105). Upon detecting the user interaction, the data processing system 115 can cause the chassis control 240 to revert from the escalation mode to the normal mode. For instance, a policy enforcement module 220 of the data processing system 115 can return, responsive to the determination that the occupant is assuming the control of vehicular functions, the chassis control module 230 from the escalation mode to the normal mode. Upon detecting the user interaction, the data processing system 115 can cause the electric vehicle 105 to change from the autonomous mode to the manual mode.

A response detector module 225 executing on the data processing system 115 can compare an elapsed time since the mechanical inducement of the internal force feedback, with a threshold time. The policy enforcement module 220 can perform, responsive to a determination that the elapsed time is greater than the threshold time, an automated countermeasure procedure to transition the electric vehicle into a stationary state. A response detector module 225 executing on the data processing system 115 can compare an elapsed time since the mechanical inducement of the internal force feedback, with a defined time duration for a first defined feedback pattern. The policy enforcement module 220 can select, responsive to the determination that the elapsed time is greater than the defined time duration, a second defined feedback pattern of the plurality of defined feedback patterns for mechanically inducing an internal force feedback via the chassis control module 230.

FIG. 4 depicts a block diagram of an example computer system 400. The computer system or computing device 400 can include or be used to implement the ADAS/data processing system 115, or its components. The computing system 400 includes at least one bus 405 or other communication component for communicating information and at least one processor 410 or processing circuit coupled to the bus 405 for processing information. The computing system 400 can also include one or more processors 410 or processing circuits coupled to the bus for processing information. The computing system 400 also includes at least one main memory 415, such as a random access memory (RAM) or other dynamic storage device, coupled to the bus 405 for storing information, and instructions to be executed by the processor 410. The main memory 415 can be or include the memory 112. The main memory 415 can also be used for storing position information, vehicle information, command instructions, vehicle status information, environmental information within or external to the vehicle, road status or road condition information, or other information during execution of instructions by the processor 410. The computing system 400 can include at least one read only memory (ROM) 420 or other static storage device coupled to the bus 405 for storing static information and instructions for the processor 410. A storage device 425, such as a solid state device, magnetic disk or optical disk, can be coupled to the bus 405 to persistently store information and instructions. The storage device 425 can include or be part of the memory 112.

The computing system 400 may be coupled via the bus 405 to a display 435, such as a liquid crystal display, or active matrix display, for displaying information to a user such as a driver of the electric vehicle 105. An input device 430, such as a keyboard or voice interface may be coupled to the bus 405 for communicating information and commands to the processor 410. The input device 430 can include a touch screen display 435. The input device 430 can also include a cursor control, such as a mouse, a trackball, or cursor direction keys, for communicating direction information and command selections to the processor 410 and for controlling cursor movement on the display 435. The display 435 (e.g., on a vehicle dashboard) can be part of the data processing system 115, the user interface 135, or other component of FIG. 1 or 2.

The processes, systems and methods described herein can be implemented by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes described herein. One or more processors in a multi-processing arrangement may also be employed to execute the instructions contained in main memory 415. Hard-wired circuitry can be used in place of or in combination with software instructions together with the systems and methods described herein. Systems and methods described herein are not limited to any specific combination of hardware circuitry and software.

Although an example computing system has been described in FIG. 4, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components (e.g., the modules and components of the ADAS 115), and illustrates one grouping of operations and responsibilities of these system components. Other groupings that execute similar overall operations are understood to be within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "data processing system" "computing device" "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

The systems and methods described herein may be embodied in other specific forms without departing from the characteristics thereof. For example, while vehicle 105 is often referred to herein by example as an electric vehicle 105, the vehicle 105 can include fossil fuel or hybrid vehicles in addition to electric powered vehicles and examples referencing the electric vehicle 105 include and are applicable to other vehicles 105. Scope of the systems and methods described herein is thus indicated by the appended claims, rather than the foregoing description, and changes that come within the meaning and range of equivalency of the claims are embraced therein.

What is claimed is:

1. A system to alert occupants in electric vehicles to assume manual control of vehicular functions, comprising:
an environment sensing module that executes on a data processing system having one or more processors disposed in an electric vehicle, to identify a condition to have an occupant within the electric vehicle assume manual control of a vehicular function from autonomous operation;
a chassis control module that executes on the data processing system, to control actuation of at least one of a suspension system, an acceleration system, a brake system, and a steering system of the electric vehicle, the chassis control module having a normal mode and an escalation mode, the normal mode to control the actuation to react to an external force feedback from outside the electric vehicle propagating through the electric vehicle to the occupant, the escalation mode to control the actuation to mechanically induce an internal force feedback from within the electric vehicle to alert the occupant to assume manual control of the vehicular function; and
a policy enforcement module that executes on the data processing system, to cause, responsive to identification of the condition, the chassis control module to change from the normal mode to the escalation mode, and to use one of a plurality of defined feedback patterns as the mechanically induced internal force feedback to convey an indication of the condition to the occupant.

2. The system of claim 1, comprising:
a sensor disposed in the electric vehicle to acquire sensory data within the electric vehicle;
a response detector module that executes on the data processing system to determine that the occupant is inattentive to the identified condition, based on the sensory data acquired from the sensor; and
the policy enforcement module to cause, responsive to the determination that the occupant is inattentive, the chassis control module to actuate at least one of the suspension system, the acceleration system, the brake system, and the steering system in accordance to the one of the plurality of defined feedback patterns.

3. The system of claim 1, comprising:
a response detector module that executes on the data processing system to determine that the occupant is inattentive to at least one of an audio alert, an audio-visual alert, and a tactile alert indicative of the identified condition; and
the policy enforcement module to cause, responsive to the determination that the occupant is inattentive, the chassis control module to change from the normal mode to the escalation mode.

4. The system of claim 1, comprising:
a response detector module that executes on the data processing system to determine that the occupant is assuming the manual control of the vehicular function; and
the policy enforcement module to return, responsive to the determination that the occupant is assuming the control of vehicular functions, the chassis control module from the escalation mode to the normal mode.

5. The system of claim 1, comprising:
a response detector module that executes on the data processing system to compare an elapsed time since the mechanical inducement of the internal force feedback, with a threshold time; and
the policy enforcement module to perform, responsive to a determination that the elapsed time is greater than the threshold time, an automated countermeasure procedure to transition the electric vehicle into a stationary state.

6. The system of claim 1, comprising:
a response detector module that executes on the data processing system to compare an elapsed time since the mechanical inducement of the internal force feedback, with a defined time duration for a first defined feedback pattern; and
the policy enforcement module to select, responsive to a determination that the elapsed time is greater than the defined time duration, a second defined feedback pattern of the plurality of defined feedback patterns for mechanically inducing an internal force feedback via the chassis control module.

7. The system of claim 1, comprising:
the chassis control module to mechanically induce the internal force feedback in accordance with the one of the plurality of defined feedback patterns, to simulate a road condition including at least one of a rumble strip, a speed bump, a raised pavement marker, and a gravel road.

8. The system of claim 1, comprising:
the policy enforcement module to select the one of the plurality of defined feedback patterns, corresponding to the identified condition.

9. The system of claim 1, comprising:
the environment sensing module to determine an estimated time or a level of urgency to have the occupant assume the manual control of the vehicular function; and
the policy enforcement module to select the one of the plurality of defined feedback patterns to mechanically induce the internal force feedback based on the estimated time or the level of urgency.

10. The system of claim 1, comprising:
a component coordination module that executes on the data processing system to cause one or more electronic control units (ECUs) disposed in the electric vehicle to maintain normal operations while the internal force feedback is mechanically induced by the chassis control module in the escalation mode.

11. An electric vehicle, comprising:
an environment sensing module that executes on a data processing system having one or more processors disposed in an electric vehicle, to identify a condition to have an occupant within the electric vehicle assume manual control of a vehicular function from autonomous operation;
a chassis control module that executes on the data processing system, to control actuation of at least one of a suspension system, an acceleration system, a brake system, and a steering system of the electric vehicle, the chassis control module having a normal mode and an escalation mode, the normal mode to control the actuation to react to an external force feedback from outside the electric vehicle propagating through the electric vehicle to the occupant, the escalation mode to control the actuation to mechanically induce an internal force feedback from within the electric vehicle to alert the occupant to assume manual control of the vehicular function; and
a policy enforcement module that executes on the data processing system, to cause, responsive to the identified condition, the chassis control module to change from the normal mode to the escalation mode, and to use one of a plurality of defined feedback patterns as the mechanically induced internal force feedback to convey the identified condition to the occupant.

12. The electric vehicle of claim 11, comprising:
a sensor disposed in the electric vehicle to acquire sensory data within the electric vehicle;
a response detector module that executes on the data processing system to determine that the occupant is inattentive to the identified condition, based on the sensory data acquired from the sensor; and
the policy enforcement module to cause, responsive to the determination that the occupant is inattentive, the chassis control module to actuate at least one of the suspension system, the acceleration system, the brake system, and the steering system in accordance to the one of the plurality of defined feedback patterns.

13. The electric vehicle of claim 11, comprising:
a response detector module that executes on the data processing system to determine that the occupant is inattentive to at least one of an audio alert, an audio-visual alert, and a tactile alert indicative of the identified condition; and
the policy enforcement module to cause, responsive to the determination that the occupant is inattentive, the chassis control module to change from the normal mode to the escalation mode.

14. The electric vehicle of claim 11, comprising:
a response detector module that executes on the data processing system to compare an elapsed time since the mechanical inducement of the internal force feedback, with a threshold time; and
the policy enforcement module to perform, responsive to a determination that the elapsed time is greater than the threshold time, an automated countermeasure procedure to transition the electric vehicle into a stationary state.

15. The electric vehicle of claim 11, comprising:
a response detector module that executes on the data processing system to compare an elapsed time since the mechanical inducement of the internal force feedback, with a defined time duration for a first defined feedback pattern; and
the policy enforcement module to select, responsive to a determination that the elapsed time is greater than the defined time duration, a second defined feedback pattern of the plurality of defined feedback patterns for mechanically inducing an internal force feedback via the chassis control module.

16. The electric vehicle of claim 11, comprising:
the chassis control module to mechanically induce the internal force feedback in accordance with the one of the plurality of defined feedback patterns, to simulate a road condition including at least one of a rumble strip, a speed bump, a raised pavement marker, and a gravel road.

17. The electric vehicle of claim 11, comprising:
a component coordination module that executes on the data processing system to cause one or more electronic control units (ECUs) disposed in the electric vehicle to maintain normal operations while the internal force feedback is mechanically induced by the chassis control module in the escalation mode.

18. A method of alerting occupants in vehicles to assume manual control of vehicular functions, comprising:
identifying, by a data processing system having one or more processors disposed in an vehicle, a condition to have an occupant within the vehicle assume manual control of a vehicular function from autonomous operation;

causing, by the data processing, responsive to the identified condition, a chassis control module of the vehicle to change from a normal mode to an escalation mode, the chassis control module configured to control actuation of at least one of a suspension system, an acceleration system, a brake system, and a steering system of the vehicle, the normal mode to control the actuation to reduce or allow an external force feedback from outside the vehicle propagating through the vehicle to the occupant, the escalation mode to control the actuation to mechanically induce an internal force feedback from within the vehicle to alert the occupant to assume manual control of the vehicular function; and using, by the data processing system, one of a plurality of defined feedback patterns as the mechanically induced internal force feedback to convey the identified condition to the occupant.

19. The method of claim 18, comprising:

determining, by the data processing system, that the occupant is inattentive to at least one of an audio alert, an audiovisual alert, or a tactile alert indicative of the identified condition; and causing, by the data processing system, responsive to the determination that the occupant is inattentive, the chassis control module to change from the normal mode to the escalation mode.

20. The method of claim 18, comprising:

simulating, by the data processing system, via mechanical inducement of the internal force feedback in accordance with the one of the plurality of defined feedback patterns, a road condition including at least one of a rumble strip, a speed bump, a raised pavement marker, and a gravel road.

* * * * *